United States Patent
Schnittman et al.

(10) Patent No.: US 10,124,490 B2
(45) Date of Patent: *Nov. 13, 2018

(54) AUTONOMOUS MOBILE ROBOT

(71) Applicant: iRobot Corporation, Bedford, MA (US)

(72) Inventors: Mark Schnittman, Somerville, MA (US); Thomas W. Bushman, Marblehead, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/252,355

(22) Filed: Aug. 31, 2016

(65) Prior Publication Data
US 2017/0080570 A1    Mar. 23, 2017

Related U.S. Application Data

(63) Continuation of application No. 14/586,099, filed on Dec. 30, 2014, now Pat. No. 9,457,471.
(Continued)

(51) Int. Cl.
*B25J 9/16* (2006.01)
*G05D 1/02* (2006.01)

(52) U.S. Cl.
CPC ............ *B25J 9/1694* (2013.01); *G05D 1/027* (2013.01); *G05D 1/0227* (2013.01);
(Continued)

(58) Field of Classification Search
CPC .... B25J 9/1694; B25J 9/1697; B25J 11/0095; B25J 5/00; Y10S 901/01; Y10S 901/46;
(Continued)

(56) References Cited

U.S. PATENT DOCUMENTS

| 6,389,329 | B1 | 5/2002 | Colens |
| 6,532,404 | B2 | 3/2003 | Colens |

(Continued)

FOREIGN PATENT DOCUMENTS

| CN | 103037744 | 4/2013 |
| CN | 103054516 | 4/2013 |

(Continued)

OTHER PUBLICATIONS

Office Action for related U.S. Appl. No. 14/586,099 dated Dec. 11, 2015.
(Continued)

*Primary Examiner* — Dalena Tran
(74) *Attorney, Agent, or Firm* — Fish & Richardson P.C.

(57) ABSTRACT

An autonomous mobile robot includes a robot body, a drive system, a sensor system, and a controller. The drive system supports the robot body and maneuvers the robot over a floor surface. The sensor system includes an inertial measurement unit for measuring a pose of the robot and issues a sensor signal including data having information regarding a pose of the robot. The controller communicates with the drive and sensor systems and executes a behavior system. The behavior system receives the sensor signal from the sensor system and executes a behavior. The behavior system executes an anti-stasis behavior in response to sensor signals indicating that the robot is constrained to evaluate a state of constraint. In addition, the behavior system executes an anti-tilt behavior in response to sensor signals indicating that the robot is tilted with respect to a direction of gravity to evaluate a state of tilt.

24 Claims, 20 Drawing Sheets

Related U.S. Application Data

(60) Provisional application No. 61/925,776, filed on Jan. 10, 2014.

(52) U.S. Cl.
CPC ... *G05D 1/0272* (2013.01); *G05D 2201/0215* (2013.01); *Y10S 901/01* (2013.01); *Y10S 901/46* (2013.01); *Y10S 901/49* (2013.01)

(58) Field of Classification Search
CPC ............... Y10S 901/49; G05D 1/0274; G05D 2201/0203; G05D 2201/0215; G05D 1/027
USPC ........ 700/245, 250, 253, 258; 901/1, 46, 47; 701/23, 25, 28, 532; 318/568.12, 568.16, 318/584–586
See application file for complete search history.

(56) References Cited

U.S. PATENT DOCUMENTS

| | | | |
|---|---|---|---|
| 6,594,844 B2 | 7/2003 | Jones | |
| 6,690,134 B1 | 2/2004 | Jones et al. | |
| 6,781,338 B2 | 8/2004 | Jones et al. | |
| 6,809,490 B2 | 10/2004 | Jones et al. | |
| 6,883,201 B2 | 4/2005 | Jones et al. | |
| 6,965,209 B2 | 11/2005 | Jones et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,388,343 B2 | 6/2008 | Jones et al. | |
| 7,389,156 B2 | 6/2008 | Ziegler et al. | |
| 7,441,298 B2 | 10/2008 | Svendsen et al. | |
| 7,448,113 B2 | 11/2008 | Jones et al. | |
| 7,571,511 B2 | 8/2009 | Jones et al. | |
| 7,636,982 B2 | 12/2009 | Jones et al. | |
| 7,761,954 B2 | 7/2010 | Ziegler et al. | |
| 8,326,469 B2 | 12/2012 | Phillips et al. | |
| 8,452,450 B2 | 5/2013 | Dooley et al. | |
| 9,149,167 B2 * | 10/2015 | Hong | A47L 9/009 |
| 9,457,471 B2 | 10/2016 | Schnittman et al. | |
| 2002/0016649 A1 | 2/2002 | Jones | |
| 2002/0120364 A1 | 8/2002 | Colens | |
| 2003/0025472 A1 | 2/2003 | Jones et al. | |
| 2004/0020000 A1 | 2/2004 | Jones | |
| 2004/0049877 A1 | 3/2004 | Jones et al. | |
| 2004/0187457 A1 | 9/2004 | Colens | |
| 2004/0207355 A1 | 10/2004 | Jones et al. | |
| 2005/0067994 A1 | 3/2005 | Jones et al. | |
| 2005/0204717 A1 | 9/2005 | Colens | |
| 2007/0016328 A1 | 1/2007 | Ziegler et al. | |
| 2007/0156286 A1 | 7/2007 | Yamauchi et al. | |
| 2007/0266508 A1 | 11/2007 | Jones et al. | |
| 2008/0027591 A1 * | 1/2008 | Lenser | G05D 1/0274 701/2 |
| 2008/0133052 A1 | 6/2008 | Jones et al. | |
| 2008/0140255 A1 | 6/2008 | Ziegler et al. | |
| 2008/0155768 A1 | 7/2008 | Ziegler et al. | |
| 2008/0307590 A1 | 12/2008 | Jones et al. | |
| 2009/0254218 A1 | 10/2009 | Sandin et al. | |
| 2009/0281661 A1 | 11/2009 | Dooley et al. | |
| 2010/0049365 A1 | 2/2010 | Jones et al. | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2012/0185095 A1 | 7/2012 | Rosenstein | |

FOREIGN PATENT DOCUMENTS

| | | |
|---|---|---|
| EP | 2270620 | 1/2007 |
| JP | 2006155274 | 6/2006 |
| JP | 2008529752 | 8/2008 |
| KR | 10-2013-0002218 | 1/2013 |
| KR | 10-2013-0021211 | 3/2013 |

OTHER PUBLICATIONS

"Facts on the Trilobite," Electrolux, accessed online <http://trilobite.electrolux.se/presskit_en/node1335.asp?print=yes&pressID=> Dec. 12, 2003, 2 pages.

"Welcome to the Electrolux Trilobite," Electrolux, accessed online <http://electroluxusa.com/node57.asp?currentURL=node142.asp%3F> Mar. 18, 2005, 2 pages.

Doty, K. L., and Harrison, R. R., Sweep Strategies for a Sensory-Driven, Behavior-Based Vacuum Cleaning Agent, AAAI 1993 Fall Symposium Series, Instantiating Real-World Agents, Research Triangle Park, Raleigh, NC, Oct. 22-24, 1993, pp. 1-6.

Everett, H.R., "Sensors for Mobile Robots," AK Peters, Ltd., Wellesley, MA, (1995) 543 pages.

Hitachi: News release: The home cleaning robot of the autonomous movement type (experimental machine) is developed. May 29, 2003. Accessed online Mar. 18, 2005 <http://www.i4u.com/japanreleases/hitachirobot.htm> 5 pages.

Honda Motor Co., Ltd., English Translation of JP11212642, Aug. 9, 1999, 31 pages.

International Preliminary Report on Patentability and Written Opinion in International Application No. PCT/US2014/072823, dated Jul. 12, 2016, 10 pages.

International Search Report in International Application No. PCT/US2014/072823, dated Apr. 1, 2015, 4 pages.

Jones, J., Roth, D., "Robot Programming: A Practical Guide to Behavior-Based Robotics," McGraw-Hill Education TAB, (Jan. 2, 2004) 288 pages.

Karcher RC 3000 Robotic Cleaner, Product page, accessed online <http://www.karcher-usa.com/showproducts.php?op=view_prod&param1=143&param2=&param3=> Mar. 18, 2005, 3 pages.

Karcher RoboCleaner RC 3000, Dec. 12, 2003, 4 pages.

Karcher, Product Manual Download, 2003, 16 pages.

Prassler, et al., English Translation of DE19849978, Feb. 8, 2001, 16 pages.

European Search Report in European Application No. 14877998.6, dated Aug. 10, 2017, 16 pages.

* cited by examiner

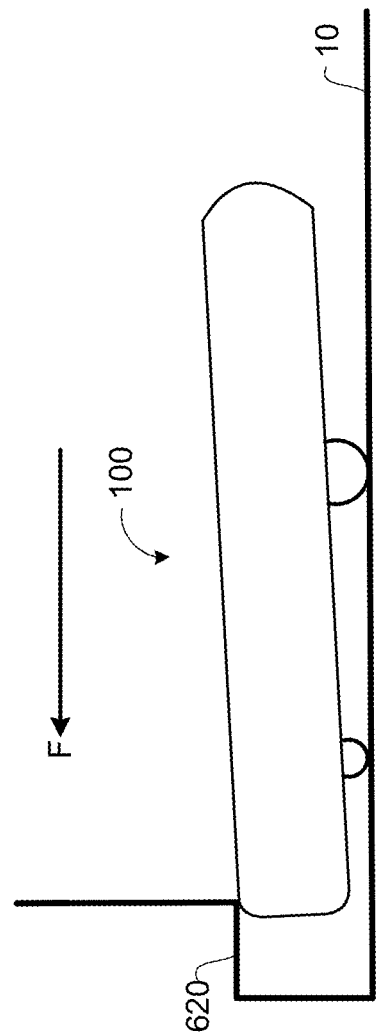

AUTONOMOUS MOBILE ROBOT

CROSS-REFERENCE TO RELATED APPLICATION

This U.S. patent application is a continuation of, and claims priority under 35 U.S.C. § 120 from, U.S. patent application Ser. No. 14/586,099, filed on Dec. 30, 2014, which claims priority under 35 U.S.C. § 119(e) to U.S. Provisional Application 61/925,776, filed on Jan. 10, 2014. The disclosures of these prior applications are considered part of the disclosure of this application and are hereby incorporated by reference in their entireties.

TECHNICAL FIELD

This disclosure relates to autonomous mobile robot stasis detection.

BACKGROUND

A vacuum cleaner generally uses an air pump to create a partial vacuum for lifting dust and dirt, usually from floors, and optionally from other surfaces as well. The vacuum cleaner typically collects dirt either in a dust bag or a cyclone for later disposal. Vacuum cleaners, which are used in homes as well as in industry, exist in a variety of sizes and models, such as small battery-operated hand-held devices, domestic central vacuum cleaners, huge stationary industrial appliances that can handle several hundred liters of dust before being emptied, and self-propelled vacuum trucks for recovery of large spills or removal of contaminated soil.

Autonomous robotic vacuum cleaners generally navigate, under normal operating conditions, a living space and common obstacles while vacuuming the floor. Autonomous robotic vacuum cleaners generally include sensors that allow them to avoid obstacles, such as walls, furniture, or stairs. The robotic vacuum cleaner may alter its drive direction (e.g., turn or back-up) when it bumps into an obstacle. The robotic vacuum cleaner may also alter drive direction or driving pattern upon detecting exceptionally dirty spots on the floor.

SUMMARY

One aspect of the disclosure provides an autonomous mobile robot including a robot body, a drive system, a sensor system and a controller. The robot body defines a forward drive direction. The drive system supports the robot body and is configured to maneuver the robot over a floor surface. The sensor system includes wheel encoders and an inertial measurement unit for measuring a pose of the robot, and issues a sensor signal. The sensor signal is indicative of the pose of the robot. The controller is in communication with the drive system and the sensor system, and has a computing processor executing a behavior system. The behavior system receives the sensor signal from the sensor system and executes at least one behavior based on the sensor signal. The behavior system executes an anti-stasis behavior in response to sensor signals indicating that the robot is constrained to evaluate a state of constraint. In addition, the behavior system executes an anti-tilt behavior in response to sensor signals indicating that the robot is tilted with respect to a direction of gravity to evaluate a state of tilt. In some examples, the behavior system executes an anti-wedge behavior in response to sensor signals indicating that the robot is wedging under an obstacle.

Implementations of the disclosure may include one or more of the following features. In some implementations, the control system executes on a computing processor and includes a control arbitration system that issues commands to resources of the robot. The control system may cause execution of a wiggle command having a wiggle angle. The wiggle command includes drive commands to drive in alternating left and right drive directions angled with respect to each other by the wiggle angle. Additionally, if the controller receives a sensor signal indicating that the robot is not executing a first wiggle command having a first wiggle angle, then the controller causes execution of a second wiggle command having a second wiggle angle greater than the first wiggle angle. Additionally, the controller issues an anti-stasis command to the drive system when signals of the inertial measurement unit and/or the wheel encoder are not within an allowable tolerance for indicating robot movement.

In some examples, the constraint state includes the robot entering or being in a wedged position with respect to an object. Additionally, the sensor signals may include a bump signal indicating contact of the robot with the object, and a wheel drop signal indicating movement of a wheel of the drive system away from the robot body.

In some implementations, the anti-stasis behavior causes execution of a drive command that backs the robot away from an impediment or turns the robot away from a side of the robot experiencing constraint (e.g. in a slewing state). Additionally, the anti-stasis behavior may further cause execution of a drive command that drives the robot in an accurate trajectory.

In some implementations, the behavior system executes the tilt behavior when the robot is tilted with respect to the direction of gravity for at least a threshold period of time. The anti-tilt behavior may cause execution of a forward drive command when the robot is pitched up with respect to the direction of gravity and the forward drive direction. Moreover, the anti-tilt behavior may cause execution of a reverse drive command when the robot is pitched down with respect to the direction of gravity and the forward drive direction.

In some implementations, the behavior system executes the anti-tilt behavior when the robot is tilted with respect to the direction of gravity at an angle greater than a threshold angle. The anti-tilt behavior may cause execution of a forward drive command when the robot is pitched up with respect to the direction of gravity and the forward drive direction, and may cause execution of a reverse command when the robot is pitched down with respect to the direction of gravity and the forward drive direction. In some implementations, the sensor system includes at least one of obstacle-detection obstacle-avoidance (ODOA) sensors, communication sensors, navigation sensors, proximity sensors, contact sensors, a camera, sonar, radar, a LIDAR, or a LADAR.

In some implementations, the autonomous mobile robot further includes a mechanical switch disposed on a bottom surface of the robot and forward of a driven wheel of the drive system. The mechanical switch activates upon contact with an obstacle or object. The behavior system may execute the stasis behavior when the mechanical switches are activated and the sensor system detects a stationary robot.

In some examples, the autonomous mobile robot further includes a cleaning system for cleaning or treating the floor surface. The behavior system may execute an anti-ingestion behavior when the mechanical switches are activated and the sensor system detects motion. The anti-ingestion behavior causes issuance of a cleaning stop command for stopping a cleaning behavior and issuance of a wiggle command having a wiggle angle. The wiggle command includes drive commands to drive in alternating left and right drive directions angled with respect to each other by the wiggle angle. Additionally or alternatively, the behavior system may execute a wheel jam behavior when the controller receives a signal from the sensor system indicating that the wheels of the robot are stalling at a stalling rate less than a stalling threshold. The wheel jam behavior causes issuance of the wiggle command for releasing a stalled wheel of the robot. The robot may further include a driven roller brush extending parallel to a transverse axis X and rotatably supported by the robot body to contact a floor surface. The driven roller brush rotates in a first direction about the X axis. The anti-ingestion behavior causes biasing of the roller brush to passively rotate in a second direction opposite the first direction, for example, to allow a wound cord to unwind from the roller brush as the robot backs away or drives away.

Another aspect of the disclosure provides a control system for an autonomous mobile robot. The control system includes a control arbitration system, a drive system, a sensor system, and a controller. The control arbitration system executes on a computing processor and issues commands to resources of the robot. The drive system includes right and left drive wheels. In addition, the drive system supports the robot body and is configured to maneuver the robot over a floor surface. The sensor system includes wheel encoders that track revolution of both dive wheels and an inertial measurement unit measuring a pose of the robot. The sensor system issues a sensor signal indicative of the pose of the robot. The controller is in communication with the drive system and the sensor system. In addition, the controller has a computing processor that executes a behavior system. The behavior system receives the sensor signals from the sensor system and executes at least one behavior based on the sensor signals. The behavior system executes an anti-stasis behavior in response to sensor signals indicating that the robot is constrained to evaluate a state of constraint and executes an anti-tilt behavior in response to sensor signals indicating that the robot is tilted with respect to a direction of gravity to evaluate a state of tilt.

Another aspect of the disclosure provides a method of operating an autonomous mobile robot. The method includes receiving, at a computing processor, a sensor signal from a sensor system. The sensor signal includes an inertial measurement or an angular orientation of the robot. The method also includes executing on the computing processor a behavior system. The behavior system receives the sensor signal from the sensor system and executes at least one behavior based on the sensor signal. The behavior system executes an anti-stasis behavior in response to sensor signals that indicate that the robot is constrained to evaluate a state constraint. In addition, the behavior system executes an anti-tilt behavior in response to sensor signals that indicate that the robot is tilted with respect to a direction of gravity to evaluate a state of tilt.

In some implementations, the anti-stasis behavior includes issuing a wiggle command having a wiggle angle. The wiggle command includes drive commands to drive in alternating left and right drive directions angled with respect to each other by the wiggle angle. The method may further include receiving, at a computing processor, a second sensor signal from the sensor system. If the second sensor signal indicates that the robot is stationary not executing after executing a first wiggle command having a first wiggle angle, the anti-stasis behavior drive system issues a second wiggle command having a second wiggle angle greater than the first wiggle angle. and the sensor system monitors sensors for robot inertia pose and wheel rotation. If the sensor signals are not within tolerance, the robot executes an anti-stasis behavior.

In some examples, the method includes executing the anti-tilt behavior when the robot is tilted with respect to the direction of gravity for at least a threshold period of time. The method may include executing a forward drive command when the robot is pitched up with respect to the direction of gravity and the forward drive direction, and executing of a reverse drive command when the robot is pitched down with respect to the direction of gravity and the forward drive direction.

In some examples, the method includes executing the anti-tilt behavior when the robot is tilted with respect to the direction of gravity at an angle greater than a threshold angle. The method may include executing a forward drive command when the robot is pitched up with respect to the direction of gravity and the forward drive direction, and executing of a reverse command when the robot is pitched down with respect to the direction of gravity and the forward drive direction.

In some implementations, the method further includes activating a mechanical switch disposed on a bottom surface of the robot forward of a drive wheel of a drive system, the mechanical switch activated when an obstacle contacts the mechanical switch. Additionally, the method may include executing the stasis behavior when the mechanical switches are activated and the sensor system detects a stationary robot.

In some implementations, the method includes cleaning or treating the floor surface using a cleaning system. The method may include executing an anti-ingestion behavior when the mechanical switches are activated and the sensor system detects motion. The anti-ingestion behavior causing issuance of a cleaning stop command for stopping a cleaning behavior and issuance of a wiggle command having a wiggle angle. The wiggle command includes drive commands to drive in alternating left and right drive directions angled with respect to each other by the wiggle angle. In some examples, the method includes executing a wheel jam behavior when the controller receives a signal from the signal system indicating that a wheel of the robot is stalling at a stalling rate less than a stalling threshold. The wheel jam behavior causes issuance of the wiggle command for releasing a stalled wheel of the robot.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6C is a side view of an exemplary autonomous robot in a wedged state.

Like reference symbols in the various drawings indicate like elements.

DETAILED DESCRIPTION

An autonomous robot movably supported can navigate a floor surface. In some examples, the autonomous robot can clean a surface while traversing the surface. The robot can remove debris from the surface by agitating the debris and/or lifting the debris from the surface by applying a negative pressure (e.g., partial vacuum) above the surface, and collecting the debris from the surface.

Figure 1:
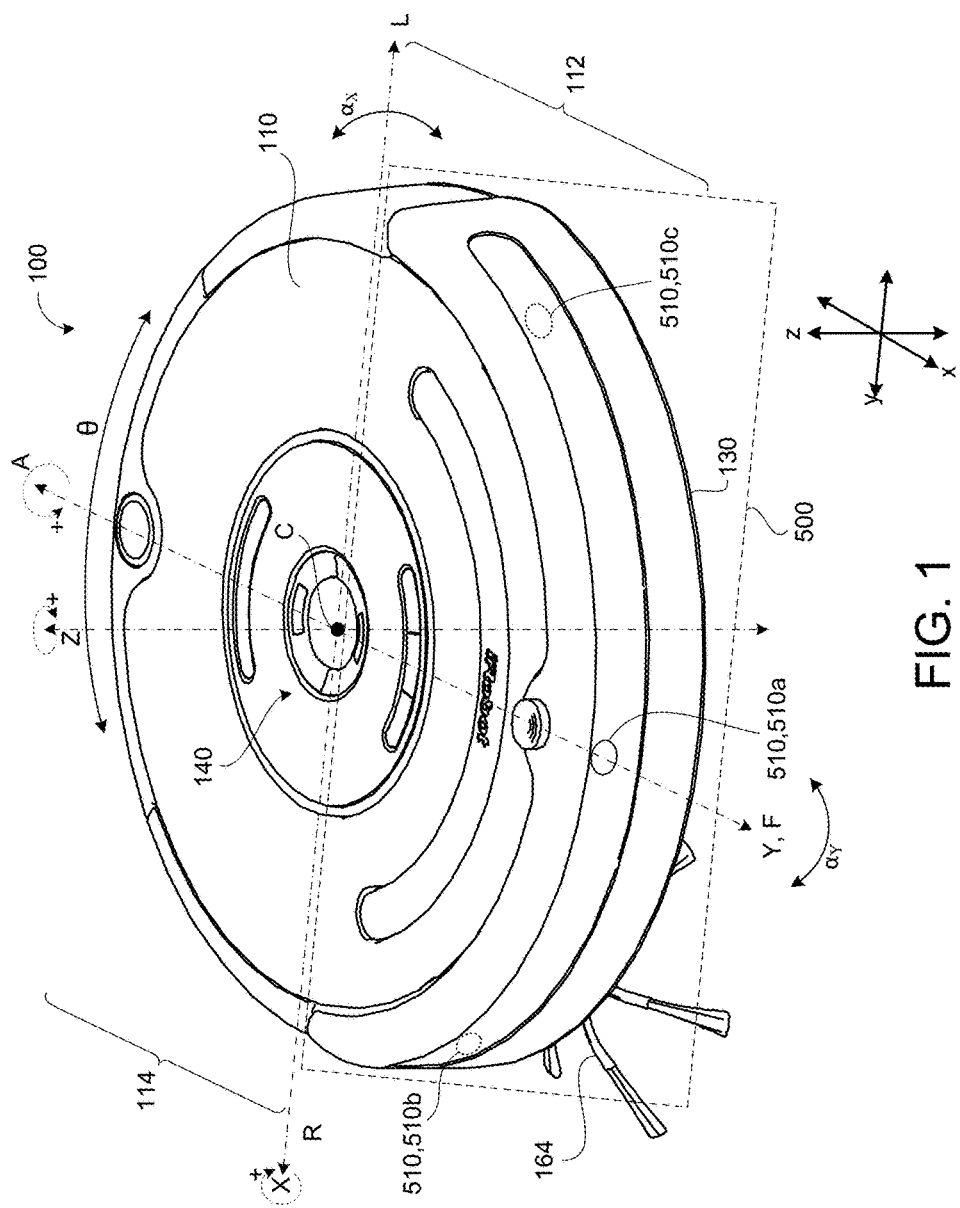
FIG. 1 is a perspective view of an exemplary autonomous mobile robot.
Figure 2:
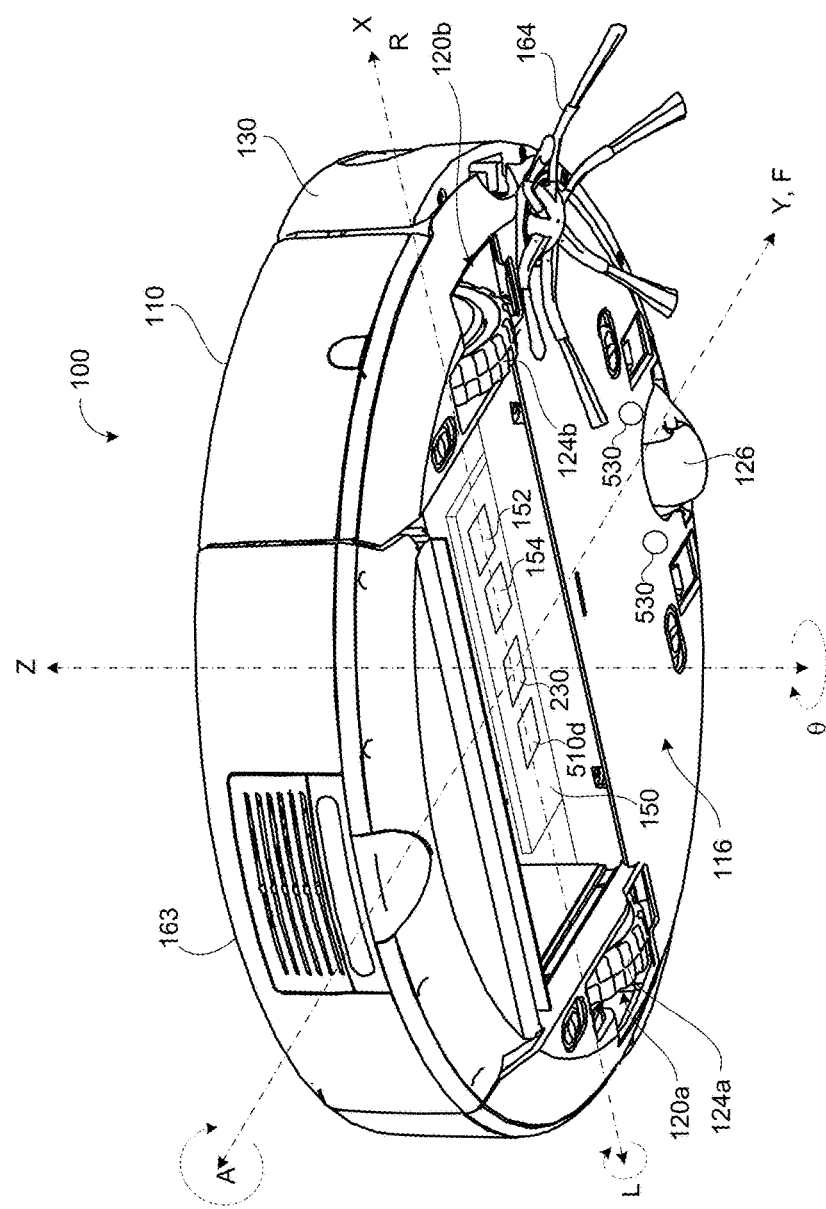
FIG. 2 is a side view of the exemplary autonomous mobile robot shown in FIG. 1.
Figure 3:
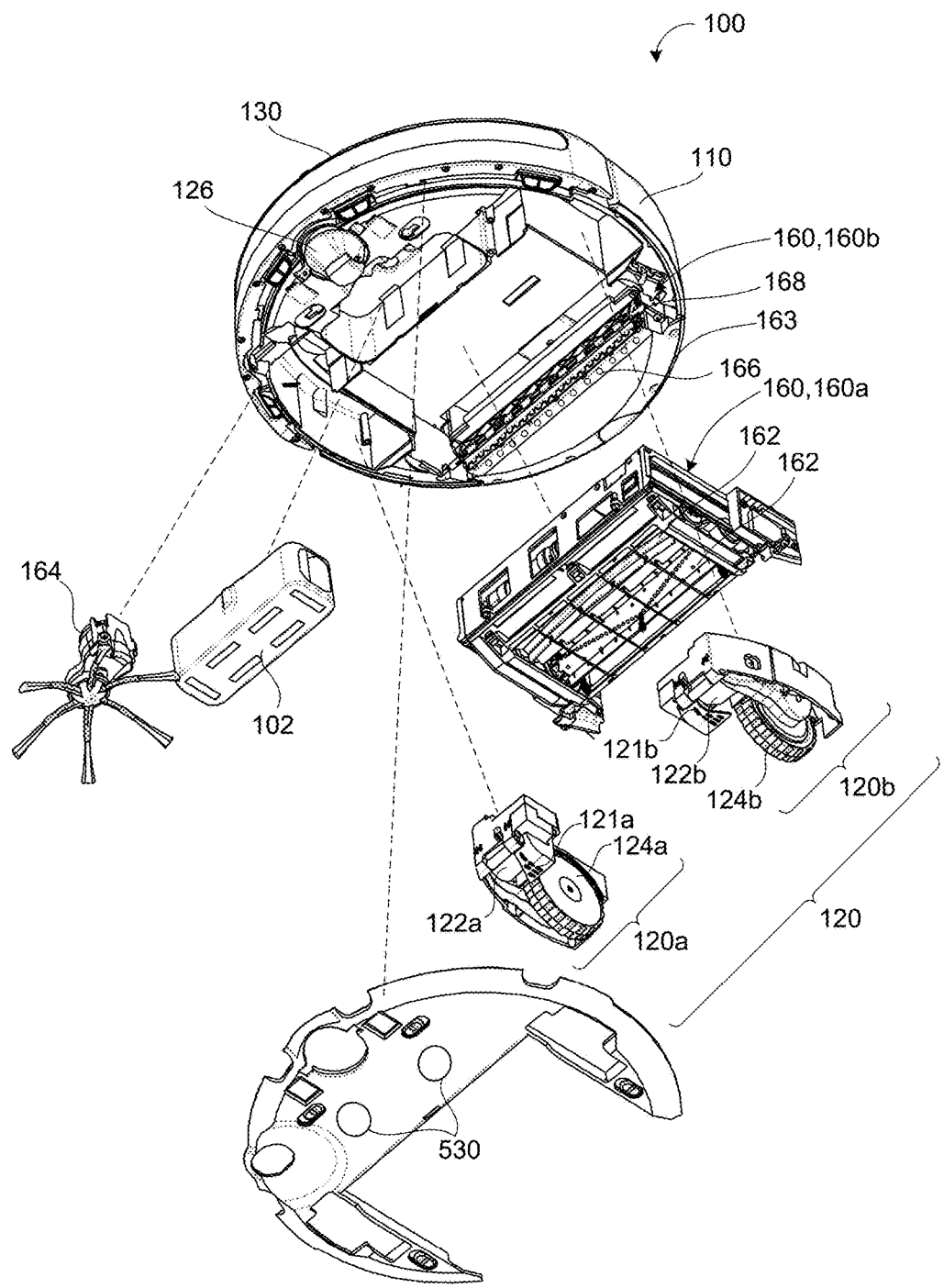
FIG. 3 is a bottom view of the exemplary autonomous mobile robot shown in FIG. 1.

Referring to FIGS. 1-3, in some implementations, a robot 100 includes a body 110 supported by a drive system 120 that can maneuver the robot 100 across the floor surface 10 based on a drive command having x, y, and θ components, for example. The robot body 110 has a forward portion 112 and a rearward portion 114. The drive system 120 includes right and left driven wheel modules 120a, 120b. The wheel modules 120a, 120b are substantially opposed along a transverse axis X defined by the body 110 and include respective drive motors 122a, 122b driving respective wheels 124a, 124b. The drive motors 122a, 122b may releasably connect to the body 110 (e.g., via fasteners or tool-less connections) with the drive motors 122a, 122b optionally positioned substantially over the respective wheels 124a, 124b. The wheel modules 120a, 120b can be releasably attached to the body 110 and forced into engagement with the cleaning surface 10 by respective springs. In some examples, the wheel module 120a, 120b includes a wheel encoder 121a, 121b, which converts the rotational motion of the wheels 124a, 124b to an analog or digital signal indicative of the rotation and/or position of the wheels 124a, 124b. In some examples, the wheels 124a, 124b are releasably connected to the wheel modules 120a, 120b respectively. The wheels 124a, 124b may have a biased-to-drop suspension system, which improves traction of the wheel modules 120a, 120b over slippery floors (e.g., hardwood, wet floors). The robot 100 may include a caster wheel 126 disposed to support a forward portion 112 of the robot body 110. The robot body 110 supports a power source 102 (e.g., a battery) for powering any electrical components of the robot 100.

The robot 100 can move across a cleaning surface through various combinations of movements relative to three mutually perpendicular axes defined by the body 110: a transverse axis X; a fore-aft axis Y; and a central vertical axis Z. A forward drive direction along the fore-aft axis Y is designated F (sometimes referred to hereinafter as "forward"), and an aft drive direction along the fore-aft axis Y is designated A (sometimes referred to hereinafter as "rearward"). The transverse axis X extends between a right side R and a left side L of the robot 100 substantially along an axis defined by center points of the wheel modules 120a, 120b.

The robot 100 can tilt about the X axis. When the robot 100 tilts to the south position it tilts towards the rearward portion 114 (sometimes referred to hereinafter as "pitched up"), and when the robot 100 tilts to the in a north position it tilts towards the forward portion 112 (sometimes referred to hereinafter as a change "pitched down"). Additionally, the robot 100 tilts about the Y axis. The robot 100 may tilt to the east of the Y axis (sometimes referred to hereinafter as a "right roll"), or the robot 100 may tilt to the west of the Y axis (sometimes referred to hereinafter as a "left roll"). Therefore, a change in the tilt of the robot 100 about the X axis is a change in its pitch, and a change in the tilt of the robot 100 about the Y axis is a change in its roll. In addition, the robot 100 may either tilt to the right, i.e., an east position, or to the left i.e., a west position. In some examples the robot 100 tilts about the X axis and about the Y axis having tilt positions, such as northeast, northwest, southeast, and southwest. As the robot 100 is traversing a floor surface 10, the robot 100 may make a left or right turn about its Z axis (sometimes referred to hereinafter as a change in the yaw). A change in the yaw causes the robot 100 to make a left turn or a right turn while it is moving. Thus the robot 100 may have a change in one or more of its pitch, roll, or yaw at the same time.

A forward portion 112 of the body 110 carries a bumper 130, which detects (e.g., via one or more sensors) one or more events in a drive path of the robot 100, for example, as the wheel modules 120a, 120b propel the robot 100 across the cleaning surface during a cleaning routine. The robot 100 may respond to events (e.g., obstacles 18, cliffs, and/or walls 20) detected by the bumper 130 by controlling the wheel modules 120a, 120b to maneuver the robot 100 in response to the event (e.g., away from an obstacle 18). While some sensors are described herein as being arranged on the bumper 130, these sensors can additionally or alternatively be arranged at any of various different positions on the robot 100 including but not limited to the bottom surface 116 of the robot (e.g., mechanical switches 530).

The robot 100 may include a cleaning system 160 for cleaning or treating a floor surface 10. The cleaning system 160 may include a dry cleaning system 160a and/or a wet cleaning system 160b. The dry cleaning system 160a may include a driven roller brush 162 (e.g., with bristles and/or beater flaps) extending parallel to the transverse axis X and rotatably supported by the robot body 110 to contact the floor surface 10. The driven roller brush 162 agitates debris off of the floor surface 10 and throws or guides the agitated debris into a collection bin 163. The cleaning system 160 may also include a side brush 164 having an axis of rotation at an angle with respect to the floor surface 10 for moving debris into a cleaning swath area of the cleaning system 160. The wet cleaning system 160b may include a fluid applicator

166 that extends along the transverse axis X and dispenses cleaning liquid onto the surface. The dry and/or wet cleaning systems 160a, 160b may include one or more squeegee vacuums 168 (e.g., spaced apart compliant blades having a partial vacuum applied therebetween via an air pump) vacuuming the cleaning surface.

A user interface 140 disposed on a top portion of the body 110 receives one or more user commands and/or displays a status of the robot 100. The user interface 140 is in communication with a robot controller 150 carried by the robot 100 such that one or more commands received by the user interface 140 can initiate execution of a cleaning routine by the robot 100. The controller 150 includes a computing processor 152 (e.g., central processing unit) in communication with non-transitory memory 154 (e.g., a hard disk, flash memory, random-access memory).

The robot controller 150 (executing a control system 210) may execute behaviors 300 that cause the robot 100 to take an action, such as maneuvering in a wall following manner, a floor scrubbing manner, or changing its direction of travel when an obstacle 18 (e.g., chair 18a, table 18b, sofa 18c, etc.) is detected. The robot controller 150 can maneuver the robot 100 in any direction across the cleaning surface by independently controlling the rotational speed and direction of each wheel module 120a, 120b. For example, the robot controller 150 can maneuver the robot 100 in the forward F and reverse (aft) A directions, or turn the robot 100 in the right R or left L directions.

Figure 4:
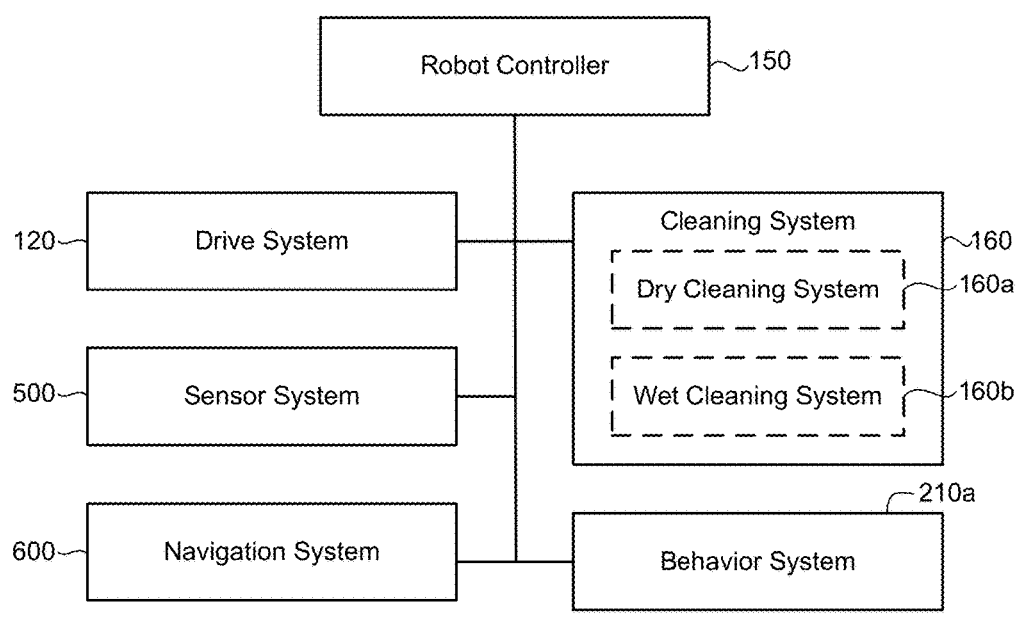
FIG. 4 is a perspective view of an exemplary autonomous mobile robot for cleaning.
Figure 5:
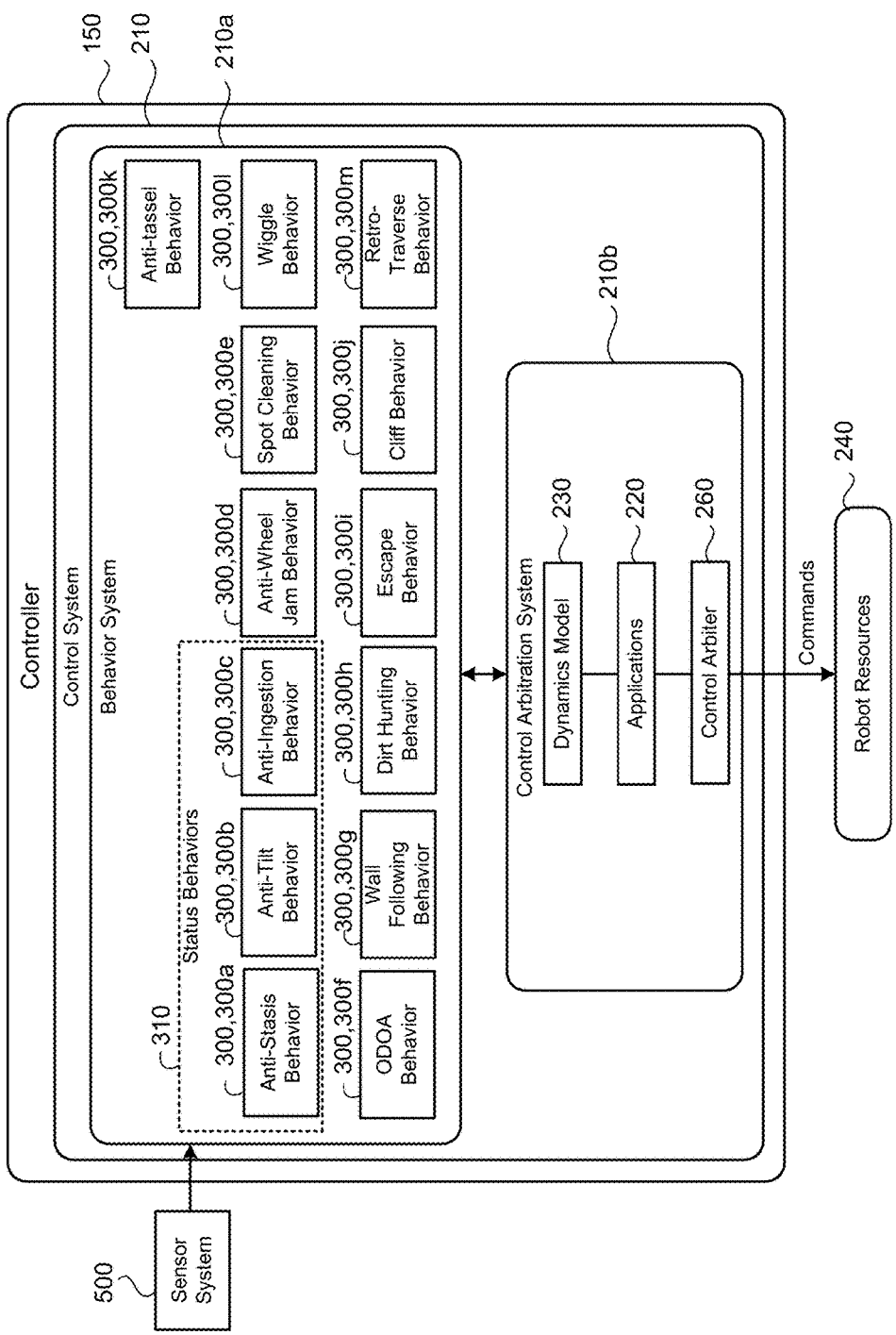
FIG. 5 is a perspective view of an exemplary autonomous mobile robot for cleaning.

Referring to FIGS. 4 and 5, to achieve reliable and robust autonomous movement, the robot 100 may include a sensor system 500 having several different types of sensors 510, which can be used in conjunction with one another to create a perception of the robot's environment sufficient to allow the robot 100 to make intelligent decisions about actions to take in that environment. The sensor system 500 may include one or more types of sensors 510 supported by the robot body 110, which may include obstacle detection/obstacle avoidance (ODOA) sensors, communication sensors, navigation sensors, etc. For example, these sensors 510 may include, but are not limited to, proximity sensors, contact sensors, a camera (e.g., volumetric point cloud imaging, three-dimensional (3D) imaging or depth map sensors, visible light camera and/or infrared camera), sonar, radar, LIDAR (Light Detection and Ranging, which can entail optical remote sensing that measures properties of scattered light to find range and/or other information of a distant target), LADAR (Laser Detection and Ranging), etc. In some implementations, the sensor system 500 includes ranging sonar sensors, proximity cliff detectors, contact sensors, a laser scanner, and/or an imaging sonar.

In some examples, the sensor system 500 includes an inertial measurement unit (IMU) 510d in communication with the controller 150 to measure and monitor the acceleration of the robot 100 and the orientation of the robot 100 with respect to the overall center of gravity $CG_R$ of the robot 100. The IMU 510d includes one or more gyroscopes (hereinafter "gyro") and one or more angular and/or linear accelerometers to measure the relative orientation of the robot 100 in space. The controller 150 may monitor any deviation in feedback from the IMU 510d from a threshold signal corresponding to normal unencumbered operation. For example, if the robot 100 begins to pitch away from an upright position, it may be beached, high centered, slewing, wedged or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

When accelerating from a stop, the controller 150 may take into account a moment of inertia of the robot 100 from its overall center of gravity $CG_R$ to prevent robot tipping. The controller 150 may use a model of its pose, including its current moment of inertia. When payloads are supported, the controller 150 may measure a load impact on the overall center of gravity $CG_R$ and monitor movement of the robot moment of inertia. If this is not possible, the controller 150 may apply a test torque command to the drive system 120 and measure actual linear and angular acceleration of the robot 100 using the IMU 510d, in order to experimentally determine safe limits.

The IMU 510d may measure and monitor the pitch, roll, and yaw of the robot 100 based on relative values. In some implementations, and over a period of time, constant movement may cause the IMU 510d to drift. The controller 150 executes a resetting command to recalibrate the IMU 510d and reset it to zero. Before resetting the IMU 510d, the controller 150 determines if the robot 100 is tilted, and issues the resetting command only if the robot 100 is on a flat surface.

In some implementations, the robot 100 includes a navigation system 600 configured to allow the robot 100 to navigate the floor surface 10 without colliding into obstacles 18 or falling down stairs, and to intelligently recognize relatively dirty floor areas for cleaning. Moreover, the navigation system 600 can maneuver the robot 100 in deterministic and pseudo-random patterns across the floor surface 10. The navigation system 600 may be a behavior based system stored and/or executed on the robot controller 150. The navigation system 600 may communicate with the sensor system 500 to determine and issue drive commands to the drive system 120. The navigation system 600 influences and configures the robot behaviors 300, thus allowing the robot 100 to behave in a systematic preplanned movement. In some examples, the navigation system 600 receives data from the sensor system 500 and plans a desired path 610 for the robot 100 to traverse.

In some implementations, the controller 150 (e.g., a device having one or more computing processors 152 in communication with non-transitory memory 154 capable of storing instructions executable on the computing processor(s)) executes a control system 210, which includes a behavior system 210a and a control arbitration system 210b in communication with each other. The control arbitration system 210b allows robot applications 220 to be dynamically added and removed from the control system 210, and facilitates allowing applications 220 to each control the robot 100 without needing to know about any other applications 220. In other words, the control arbitration system 210b provides a simple prioritized control mechanism between applications 220 and resources 240 of the robot 100.

The applications 220 can be stored in memory or communicated to the robot 100, to run concurrently on (e.g., on a processor) and simultaneously control the robot 100. The applications 220 may access behaviors 300 of the behavior system 210a. The independently deployed applications 220 are combined dynamically at runtime and to share robot resources 240 (e.g., drive system 120 and/or cleaning systems 160, 160a, 160b). A low-level policy is implemented for dynamically sharing the robot resources 240 among the applications 220 at run-time. The policy determines which application 220 has control of the robot resources 240 as required by that application 220 (e.g. a priority hierarchy among the applications 220). Applications 220 can start and stop dynamically and run completely independently of each other. The control system 210 also allows for complex behaviors 300, which can be combined together to assist each other.

The control arbitration system 210b includes one or more application(s) 220 in communication with a control arbiter 260. The control arbitration system 210b may include components that provide an interface to the control arbitration system 210b for the applications 220. Such components may abstract and encapsulate away the complexities of authentication, distributed resource control arbiters, command buffering, coordinate the prioritization of the applications 220 and the like. The control arbiter 260 receives commands from every application 220, generates a single command based on the applications' priorities, and publishes it for its associated resources 240. The control arbiter 260 receives state feedback from its associated resources 240 and may send it back up to the applications 220. The robot resources 240 may be a network of functional modules (e.g., actuators, drive systems, and groups thereof) with one or more hardware controllers. The commands of the control arbiter 260 are specific to the resource 240 to carry out specific actions. A dynamics model 230 executable on the controller 150 is configured to compute the center for gravity (CG), moments of inertia, and cross products of inertia of various portions of the robot 100 for assessing a current robot state.

In some implementations, a behavior 300 is a plug-in component that provides a hierarchical, state-full evaluation function that couples sensory feedback from multiple sources, such as the sensor system 500, with a-priori limits and information into evaluation feedback on the allowable actions of the robot 100. Since the behaviors 300 are pluggable into the application 220 (e.g. residing inside or outside of the application 220), they can be removed and added without having to modify the application 220 or any other part of the control system 210. Each behavior 300 is a standalone policy. To make behaviors 300 more powerful, it is possible to attach the output of multiple behaviors 300 together into the input of another so that you can have complex combination functions. The behaviors 300 are intended to implement manageable portions of the total cognizance of the robot 100.

In the example shown, the behavior system 210a includes an obstacle detection/obstacle avoidance (ODOA) behavior 300f for determining responsive robot actions based on obstacles 18 perceived by the sensor 510 (e.g., turn away; turn around; stop before the obstacle 18, etc.). Another behavior 300 may include a wall following behavior 300g for driving adjacent a detected wall 20 (e.g., in a wiggle pattern of driving toward and away from the wall 20). Other behaviors 300 may include a dirt hunting behavior 300h (where the sensor(s) detect a dirty spot on the floor surface 10 and the robot 100 veers towards the spot for cleaning), a spot cleaning behavior 300e (e.g., the robot 100 follows a cornrow pattern to clean a specific spot), a cliff behavior 300j (e.g., the robot 100 detects stairs and avoids falling from the stairs), an anti-stasis behavior 300a, an anti-tilt behavior 300b, an anti-ingestion behavior 300c, and a wheel jam behavior 300d.

In some examples, the behavior system 210a includes status behaviors 310 that detect a status of the robot 100 and may trigger an escape behavior 300i to help the robot 100 overcome an object that was sucked in its vacuum 168 or when the robot 100 is getting wedged and tilted, beached, or slewing (e.g., when one wheel 124a or 124b turns while the other is hooked). In some examples, the status behaviors 310 include an anti-stasis behavior 300a, an anti-tilt behavior 300b, and an anti-ingestion behavior 300c.

Figure 6A:
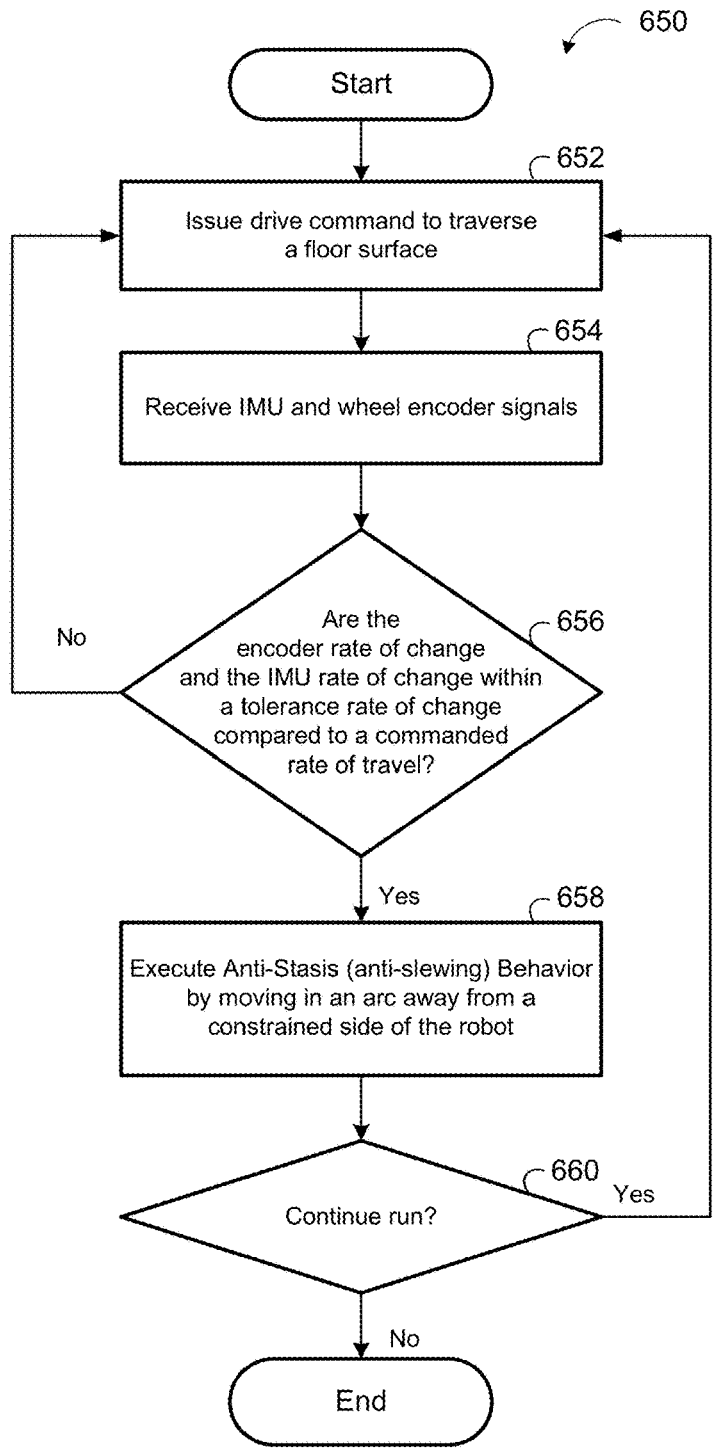
FIG. 6A is a flow diagram of the anti-stasis behavior of an exemplary autonomous mobile robot.

FIG. 6A provides a flow diagram 650 for executing the anti-stasis behavior 300a of the robot 100. As the robot 100 traverses a floor surface 10 due to the controller 150 executing/issuing a drive command at block 652, the robot 100 regularly receives signals from the IMU 510d determining the pose of the robot 100 at block 654. The controller 150 determines, at decision block 656, if the robot 100 is moving or stuck and tilted based on the received IMU signal, and then determines which behavior 300 to execute. If the robot 100 is not moving even after a drive command, the controller 150 executes the anti-stasis behavior 300a to attempt to free the robot 100 at block 658. If the robot 100 is not stationary (i.e., moving), but tilted, then the controller 150 executes an anti-tilt behavior 300b to return the robot 100 to its normal surface. In some examples, the sensor signal indicates that the robot 100 is tilted with respect to a direction of gravity. The behavior system 210a may execute an anti-tilt behavior 300b to evaluate a state of constraint.

The robot 100 monitors (e.g., simultaneously or serially) a plurality of parameters to detect the conditions of the wheels 124a, 124b, such as if the wheels 124a, 124b are spinning without movement or the robot 100 is wedged. These monitored parameters include: 1) a commanded rate of travel; 2) an encoder rate of wheel rotation; and 3) the IMU (gyro) rate of rotation. For example, the robot 100 detects if the controller 150 issued a command to the robot 100 to drive in a forward drive direction F and whether the robot 100 is actually driving in the forward drive direction F. The robot 100 monitors, at block 654, the gyro and the wheel encoders to determine which wheel 124a, 124b is not rotating. The robot 100 determines if the three monitored parameters (command rate, encoder rate, and gyro rate of change with respect to the orientation of the robot 100) are within a tolerance. The faster the robot 100 is turning, the more tolerance it allows for variation among the three monitored parameters. The tolerance value also depends on calibration of the gyro and the wheel encoders 121a, 121b, and whether the geometry of the robot 100 resists turning and slippage of the wheels 124a, 124b.

Figure 6B:
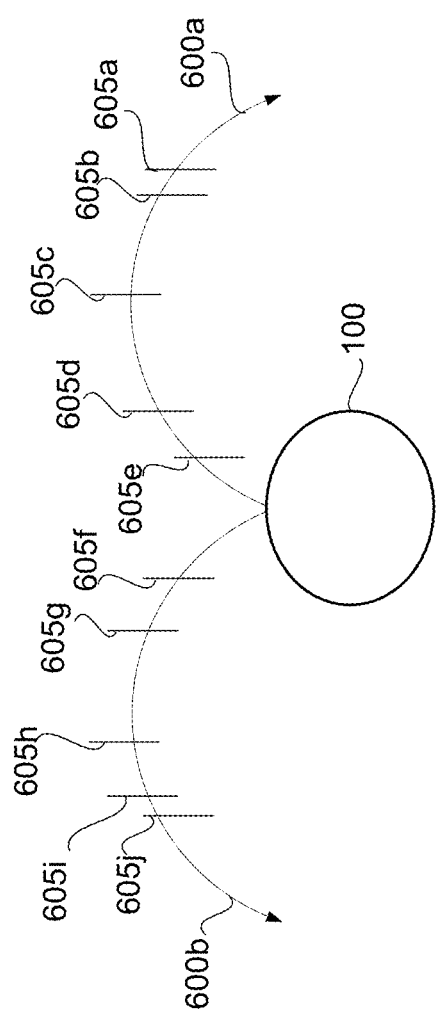
FIG. 6B is a perspective view of an exemplary autonomous robot executing a stasis condition escape behavior.

For example, if the robot 100 is slewing, then one wheel 124a, 124b may be hooked. The sensor system 500 of the robot 100 determines if the controller 150 issued a command to the robot 100 to drive in a forward drive direction F and whether the robot 100 is actually driving in the forward drive direction F. If the robot 100 is not moving in the forward drive direction F as commanded by the controller 150, the robot 100 determines which one of the wheels 124a, 124b is not rotating and turns counter clockwise at a given rate, while monitoring the rate of rotation of the encoders 121a, 121b and the gyro of the IMU 510d. At decision block 656, the robot 100 compares the commanded rate of rotation (received from the controller 150), the encoder rate of rotation, and the IMU rate of rotation to verify that the actual motion of the robot 100 is in accord with the commands issued by the controller 150. If the three parameter values are not within a parameter tolerance threshold for agreement with the commanded motion, the robot 100 detects stasis. Thus, the robot 100 determines at decision block 656 if the encoder rate of change and the IMU rate of change are within a tolerance rate of change compared to a commanded rate of travel. The robot 100 executes the anti-stasis 300a behavior by moving in an arc away from a constrained side of the robot 100 at block 658 when the encoder rate of change and the IMU rate of change are within the tolerance rate of change compared to the commanded rate of travel. However, the robot continues to issue drive commands to traverse the robot 100 about the floor surface 10 at block 652 when the encoder rate of change and the IMU rate of change are not within the tolerance rate of change compared to the commanded rate of travel. Decision block 660 determines whether or not the robot 100 should continue to issue drive commands at block 652. In some implementations, to escape a constrained state, the robot 100 backs away from the impediment, turns 90 degrees away from the stuck wheel (the side that experienced constraint) and then drives in a forward direction F, moving forward in an arc trajectory of between about −135 degrees to +135 degrees to prevent systemic neglect. As shown in FIG. 6B, the arc movement 600a, 600b has the same radius in either direction, but the distance traveled changes by discontinuing the arc movement 600a, 600b at various, randomly selected points 605a-605j along the trajectory of the arc 600a, 600b. By driving in an arcing trajectory 600a, 600b of random extent, the robot 100 maximizes coverage and minimizes likelihood of immediately encountering the obstacle 18 again.

In some implementations, the robot 100 may employ additional sensors 510 for detecting that the bumper 130 is encountering an obstacle 18 while the wheel modules 120a, 120b are dropping and/or pressing against a pressure sensor indicating that the robot 100 is entering a wedged state between a floor surface 10 and an overhang 620, as shown in FIG. 6C. The controller 150 monitors compression sensors and/or the wheel drop sensor for wedging and issues an anti-stasis command to back the robot 100 away from the wedge condition, such as a cabinet overhang 620. The robot 100, therefore, detects the initial stage of getting wedged and executes an escape behavior before the robot 100 is fully wedged and unable to escape. The anti-stasis escape behavior 300a includes backing the robot 100 away from the impediment or turning the robot 100 away from a side of the robot 100 experiencing constraint, before the 100 robot becomes fully wedged and immobilized. In some examples, the behavior system 210a executes an anti-wedge behavior in response to sensor signals indicating that the robot is wedging under an obstacle. The anti-wedge behavior may include issuing a full-power reverse drive command to the drive system 120. Moreover, the reverse drive command may entail turning away from a constrained side R, L of the robot 100.

Figure 7A:
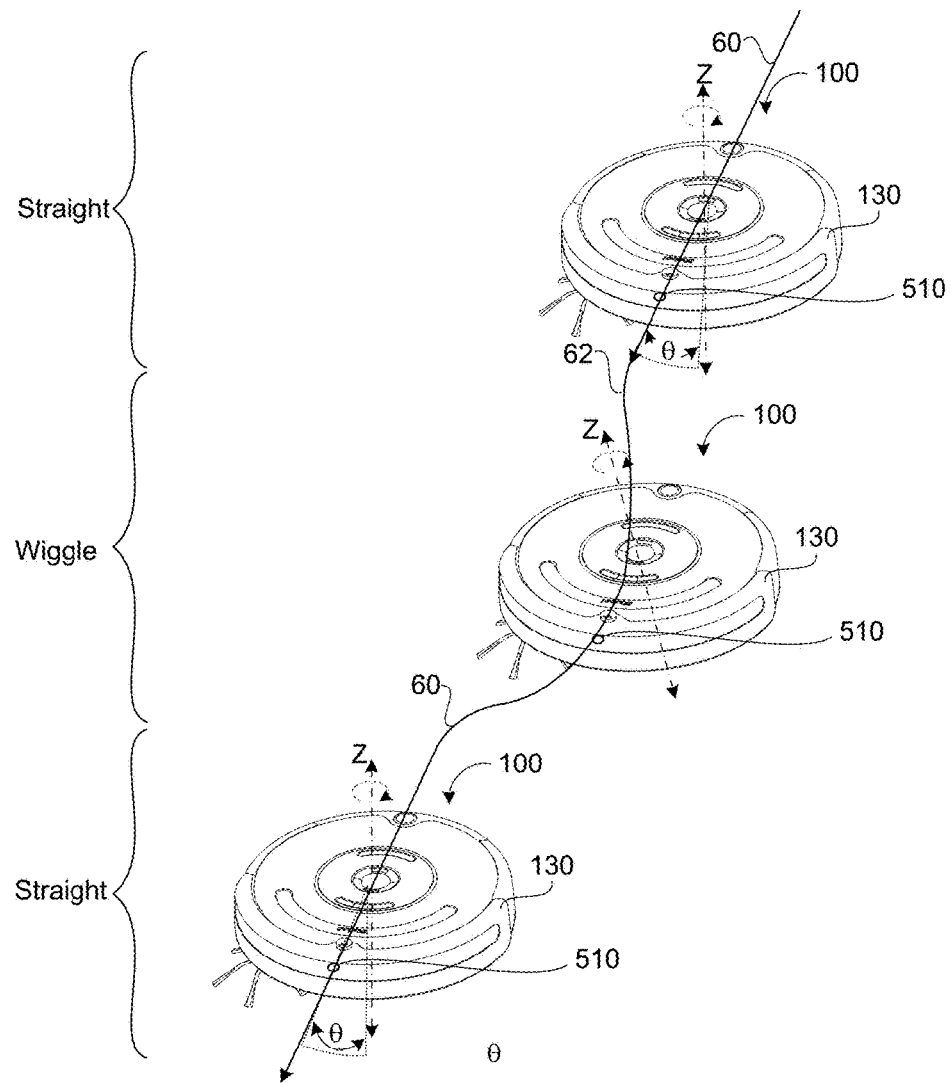
FIGS. 7A and 7B are perspective views of exemplary autonomous robots wiggling about the Z-axis.
Figure 7B:
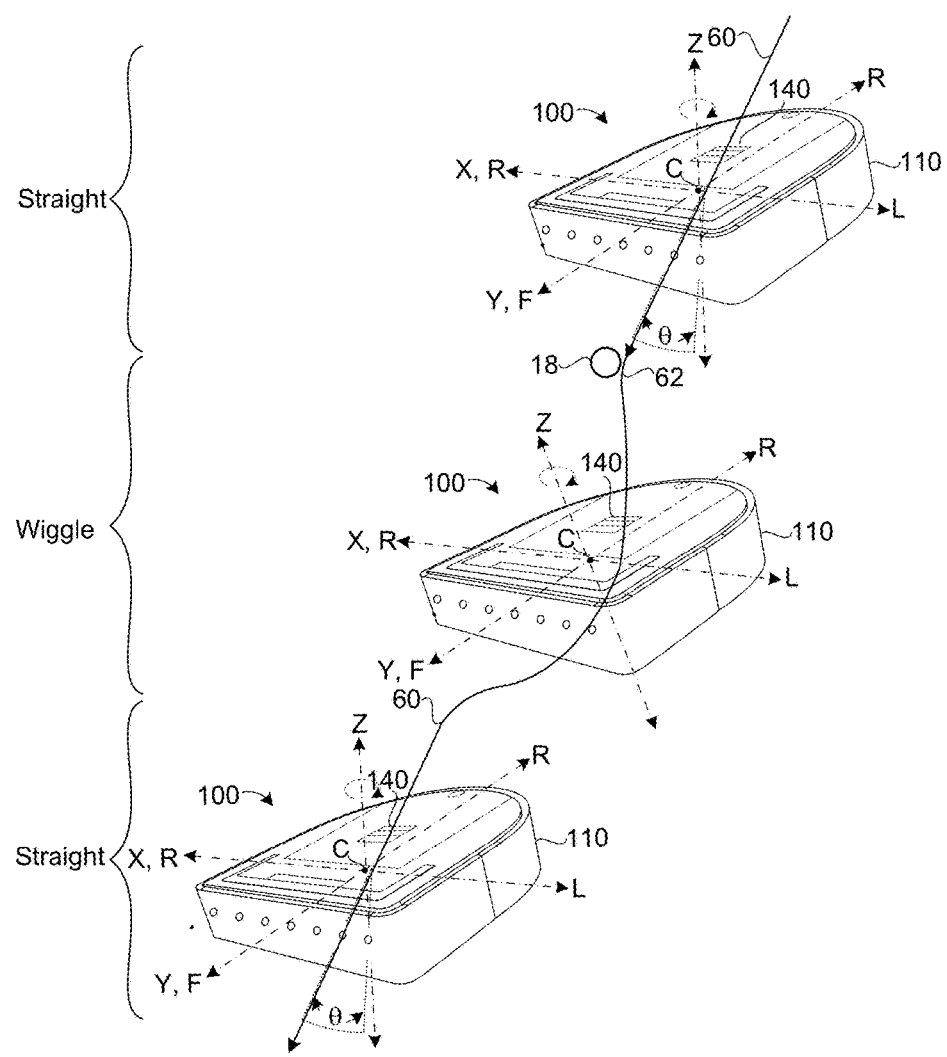

Referring to FIGS. 7A and 7B, in some implementations, the controller 150 executes a "stuck-check-swerve" routine to determine if the robot 100 is beached. The "stuck-check-swerve" routine implements at least two subsequent "wiggles," or turns, in opposite directions. FIG. 7A shows a robot 100 having a round bumper 130, while FIG. 7B shows a robot 100 having a square bumper 130. As the robot 100 moves substantially along the fore-aft axis Y, the robot 100 may make repeated alternating right and left turns such that the robot 100 rotates back and forth around the center vertical axis Z (hereinafter referred to as a wiggle motion). The wiggle trajectories of the robot 100 are very small arcs. In some examples, the robot 100 turns about 5 degrees to 10 degrees over 10 cm of forward F drive. The robot 100 may wiggle periodically to check for stasis caused by beaching. When the robot 100 first wiggles, the controller 150 monitors the three parameters during slewing: the commanded rate of travel; the encoder rate of wheel rotation; and the IMU (gyro) rate of rotation. During the wiggle motion, the three measurements should track together. If the three parameters are not tracking within their parameter tolerance threshold for a certain amount of time, the controller 150 receives a signal indicating that the robot 100 did not execute the first wiggle motion as commanded (by the controller 150). The robot 100 changes its state to "beaching suspected" and executes a second wiggle angle θ greater (e.g., a more pronounced arc angle) than the first wiggle angle θ.

The controller 150 monitors the IMU 510d and the wheel encoders 121a, 121b for increased wiggle when the robot 100 is driving in the forward direction F in a "beaching suspected" state. If the sensor signals of the IMU 510d and the wheel encoders 121a, 121b do not confirm that the robot 100 is executing the second wiggle (that is greater than the first wiggle), then the robot 100 did not execute the second wiggle as commanded and is beached. The robot 100 may then initiate an escape behavior 300i, for example, a spin-in-place followed, in some implementations, by traveling in an arc trajectory for a randomly selected length of travel along the arc.

In some implementations, the wiggle motion consists of three turns while the robot 100 is moving in the forward drive direction F. The first turn diverts the robot 100 from the forward travel trajectory by angle dθ. The second turn diverts the robot 100 by −2dθ, and the third turn re-aligns the robot 100 with the original path with a turn of dθ. The wiggle motion may allow the robot 100 to operate as a scrubber during a cleaning operation. Moreover, the wiggle motion may be used by the robot controller 150 to detect robot stasis, as described above with regard to detecting a beached state. Additionally or alternatively, the robot controller 150 may maneuver the robot 100 to rotate substantially in place such that the robot 100 can maneuver out of a corner or away from an obstacle 18, for example. The robot controller 150 may direct the robot 100 over a substantially random (e.g., pseudo-random) path while traversing the cleaning surface 10. The robot controller 150 can be responsive to one or more sensors 510 (e.g., bump, proximity, wall, stasis, and cliff sensors) disposed about the robot 100. The robot controller 150 can redirect the wheel modules 120a, 120b in response to signals received from the sensors 510, causing the robot 100 to avoid obstacles 18 and clutter while treating the cleaning surface. If the robot 100 becomes stuck or entangled during operation, the robot controller 150 may issue commands to the wheel modules 120a, 120b through a series of escape behaviors 300i, so that the robot 100 can escape and resume normal operations (e.g., cleaning operation).

Figure 8:
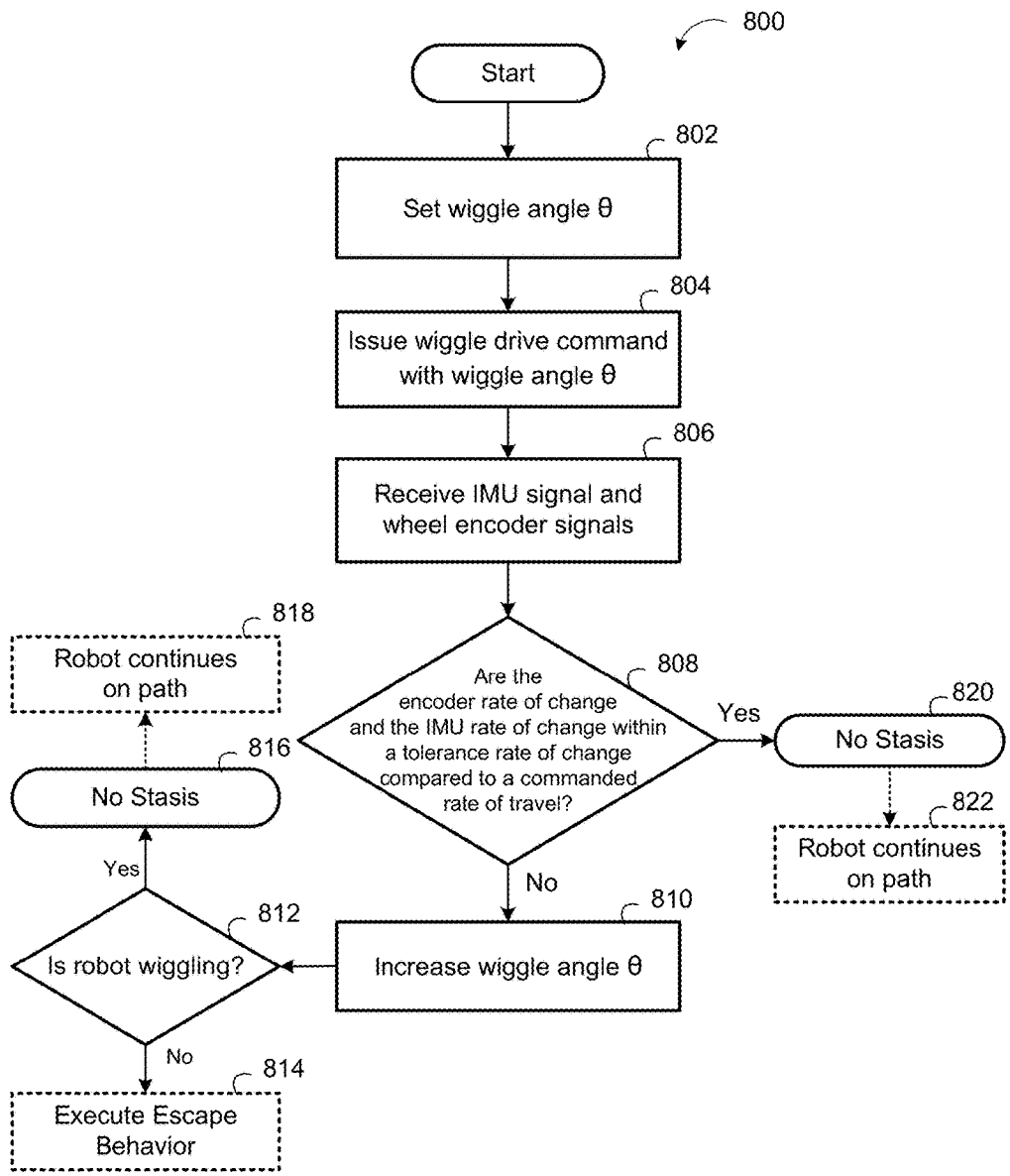
FIG. 8 is a flow diagram of the anti-stasis behavior of an exemplary autonomous mobile robot.

FIG. 8 is a flow diagram 800 of the anti-stasis behavior 300a determining if the robot 100 is beached, causing the robot 100 to be motionless. The anti-stasis behavior 300a causes the robot 100 to drive in a manner detectable by the IMU 510d. Beaching occurs when the robot 100 drives up on an obstacle 18 (e.g., carpet 10b, base of lamp) elevated enough so that the wheels 124a, 124b of the robot 100 do not have enough traction to drive the robot 100 (at least one wheel not touching the floor surface 10). Referring back to FIGS. 7A and 7B, the anti-stasis behavior 300a directs the drive system 120 to veer the robot 100 from its straight path at a wiggle angle θ, changing the path of the robot 100 to a curved path 62, and then goes back to its original straight path 60. As shown in FIG. 8, the anti-stasis behavior 300a sets the wiggle angle θ at block 802, issues drive commands with wiggle angle θ to the drive system 120 to veer the robot at block 804, and receives the IMU 510d signal and the encoder signals 121a, 121b signals at block 806. In some examples, wiggle motion includes three turns while the robot 100 is moving in the forward drive direction F. The first turn diverts the robot 100 from the forward drive direction F by angle dθ. The second turn diverts the robot 100 from the forward drive direction F by −2dθ, and the third turn re-aligns the robot 100 with the original path with a turn of de. The wiggle motion changes the heading of the robot 100, and therefore, the IMU 510d detects the movement. When the wiggle motion occurs, the IMU 510d detects the movement and the sensor system 500 issues a sensor signal received by the control system 210. The control system 210 compares the received sensor signal with an expected response to the issued anti-stasis behavior 300a. When the robot 100 first wiggles, the controller 150 monitors the commanded rate of travel, the encoder rate of wheel rotation, and the IMU (gyro) rate of rotation. During the wiggle motion, the three measurements should track together. Accordingly, the controller 150 determines if the encoder rate of change and the IMU rate of change are within a tolerance rate of change compared to a commanded rate of travel at decision block 808. If the three parameters are tracking within their parameter tolerances or thresholds for a certain amount of time (e.g., decision block 808 is "Yes"), the controller 150 receives a signal indicating that the robot 100 is not in stasis at block 820 and the robot 100 may continue to maneuver about a path at block 822. If the three parameters are not tracking within their parameter tolerances or thresholds for a certain amount of time (e.g., decision block 808 is "No"), the controller 150 receives a signal indicating that the robot 100 did not execute the first wiggle motion as commanded. The robot 100 changes its state to "beaching suspected" and executes a second wiggle at block 810 having a second wiggle angle θ greater than the first wiggle angle θ (e.g. a more pronounced arc angle) to verify that the robot 100 is in a stasis state. The controller 150 monitors the commanded rate of travel, the encoder rate of wheel rotation, and the IMU (gyro) rate of rotation, and if the three values are not within their parameter tolerances or thresholds at decision block 812 (e.g., decision block 812 is "No"), the robot 100 executes an anti-stasis behavior 300a at block 814, such as a backup, turn away from the side of the robot 100 that experienced constraint, and move in an arcing trajectory or random extent. If, however, the three values are not within their parameter tolerances or thresholds at decision block 812 (e.g., decision block 812 is "Yes"), the controller 150 detects the robot 100 is not in stasis at block 816 and the robot 100 may continue to maneuver along a path at block 818.

As described above, in some implementations, the controller 150 may continue executing an anti-stasis behavior 300a until it receives a sensor signal from the IMU 510d that detects a movement in the robot 100, and therefore freeing the robot 100 from its stasis position. In some examples, the angle θ is predetermined. The control system 210 monitors the robot behaviors 300 and the frequency that the robot 100 tilts and therefore adjusts the angle θ by increasing or decreasing the angle.

In some implementations, if the robot 100 tilts toward one of a north, a south, an east, a west, a northeast, a northwest, a southeast, or a southwest position, for more than a threshold angle (e.g., greater than 15 degrees) and for more than a threshold period of time (e.g., greater than 3 seconds), then the anti-tilt behavior 300b may be triggered. The threshold time may be between 0.1 and 10 seconds.

Figure 9A:
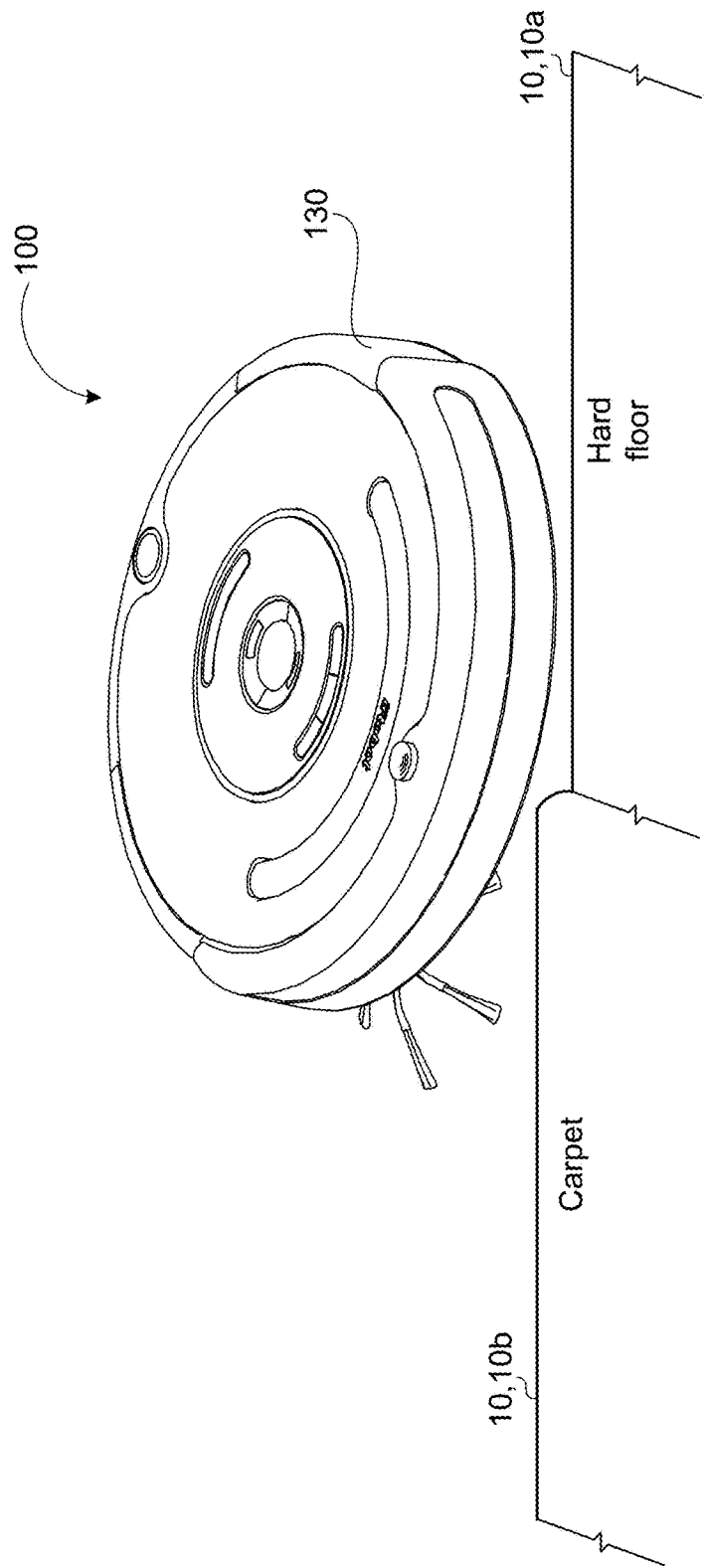
FIG. 9A is a front view of an exemplary autonomous robot as it traverses two different floors.
Figure 10A:
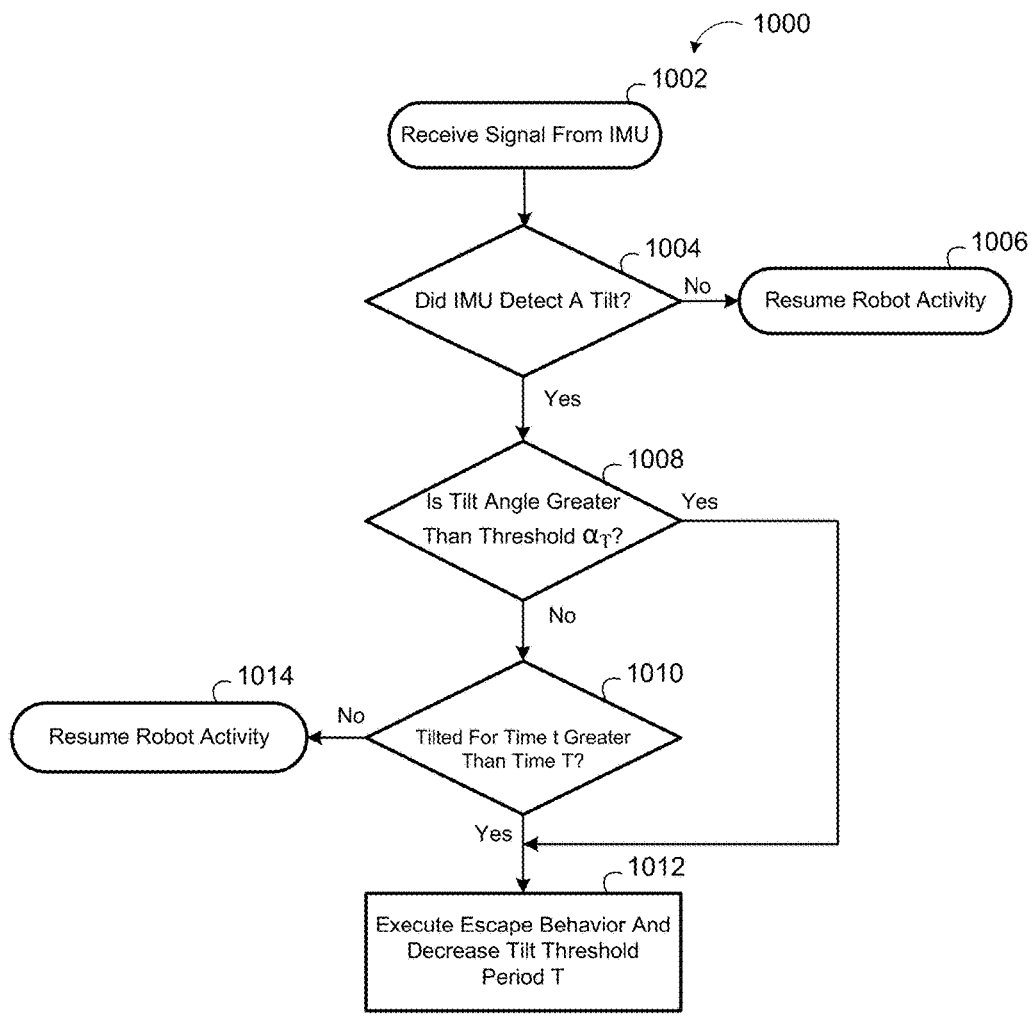
FIG. 10A is a flow diagram of the anti-tilt behavior of an exemplary autonomous mobile robot.
Figure 11A:
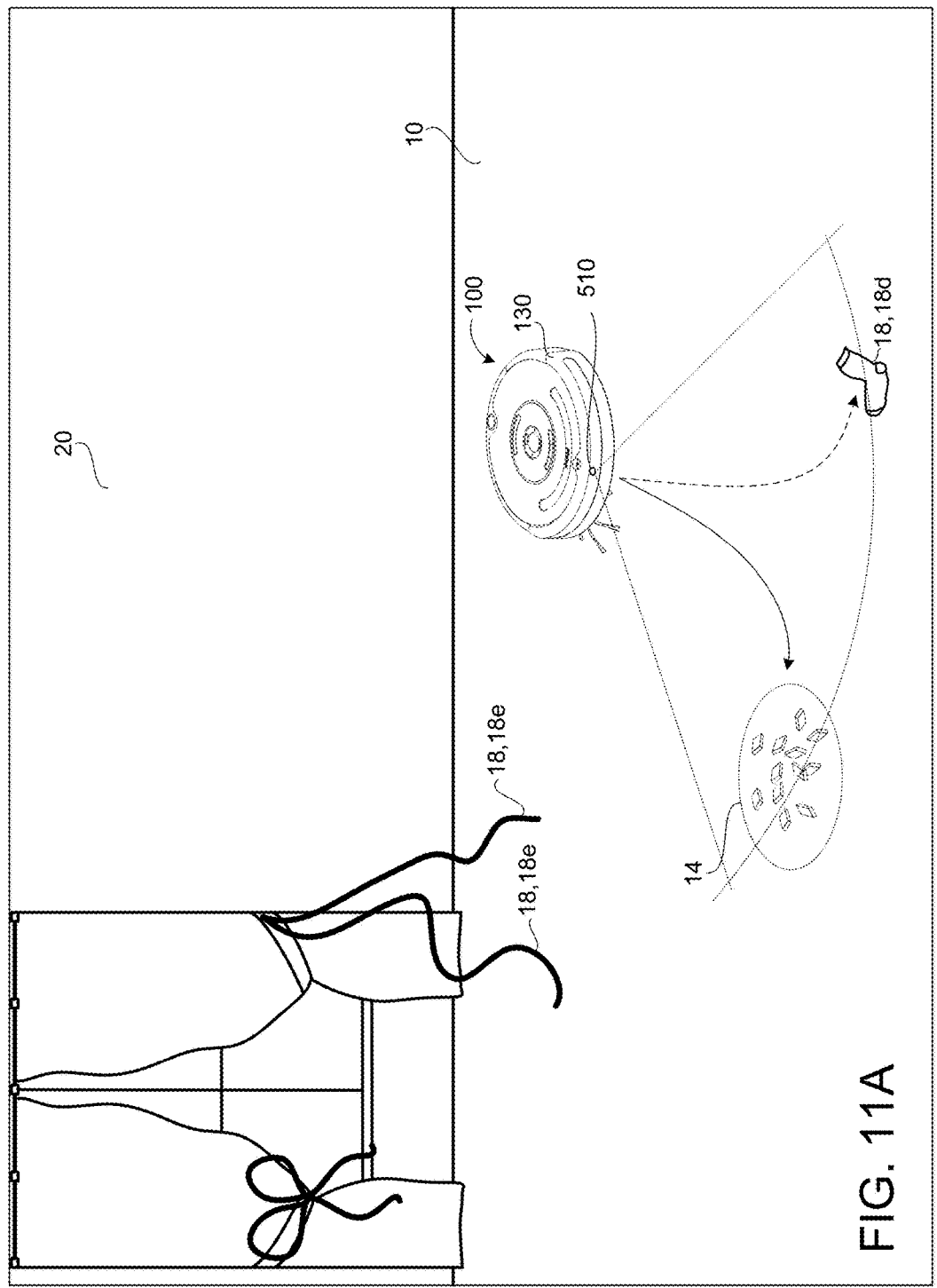
FIG. 11A is a perspective view of an exemplary autonomous cleaning mobile robot.

Referring to FIGS. 9A, 10A, and 11A in some examples, the robot 100 moves from a first surface 10a (e.g., hard surface) to a second surface 10b (e.g., carpet), or vice versa, where each floor surface 10 has a different height than the other floor surface 10. Using signals from the IMU 510d, a background behavior 300 of the robot 100 monitors tilt and roll of the robot 100 so that the robot 100 is never off plane for more than a predetermined period of time (tilt period threshold), e.g., half a second. This tilt period threshold starts at a threshold value of a quarter of a second (0.25 seconds) at the beginning of a run and increases as the robot 100 gets closer to the end of the run, the tilt period threshold increasing to 1 second, for example. If the robot 100 finishes its mission (i.e. the cleaning run) without getting stuck, the tilt period threshold starts off at a higher value on the next run. For example, the title period threshold starts at one second and stays there. If the robot 100 gets stuck during a run (i.e. encounters a stasis condition), the tilt period threshold starts off in the next run at a lower value, for example one eighth of a second, and increases throughout the run as the robot 100 progresses without a stasis condition. In other implementations, the tilt period threshold of the robot 100 can start at a higher value if the robot 100 is timed launched (i.e. unattended and scheduled), and the tilt period threshold can start at a lower value if the robot 100 is launched into a run by a button push from a user.

In such situations, the controller 150 determines if the robot 100 is tilted (e.g., on a raised doorway threshold) in order to issue an escape behavior 300i causing the robot 100 to return to a flat surface 10. The anti-tilt behavior 300b may be triggered when the IMU 510d detects that the robot 100 is tilted (pitch or roll) beyond a threshold angle $\alpha_T$ for a specified period of time (i.e. "tilt period threshold"). The threshold angle $\alpha_T$ may be programmable. In some implementations, the controller 150 monitors the robot performances and adjusts the threshold angle $\alpha_T$ based on its performances. Similarly, as described above, the tilt period threshold of time may also be adjustable based on the performance of the robot 100.

Referring to the flow diagram 1000 of FIG. 10A, in some examples, the controller 150 receives a signal from the IMU 510d at block 1002, and at decision block 1004, determines if the received signal indicates that the robot 100 is tilted. If the robot 100 is not tilted (e.g., decision block 1004 is "No"), the robot 100 carries on with its intended activity at block 1006 (e.g., Resume Robot Activity). However, if the robot 100 is tilted (e.g., decision block 1004 is "Yes"), then the controller 150 determines, at decision block 1008, if a tilt angle α is greater than a threshold tilt angle $\alpha_T$. If the tilt angle α is greater than the threshold tilt angle $\alpha_T$ (e.g., decision block 1008 is "Yes"), then the controller 150 executes, at block 1012, an escape behavior 300i to release the robot 100 from the tilted situation, and resume its activities on a flat surface. However, if the tilt angle α is less than the threshold tilt angle $\alpha_T$ (e.g., decision block 1008 is "No"), the controller 150 determines, at decision block 1010, if the robot 100 has been tilted for a period of time t greater than a threshold period of time T. If the robot 100 has been tilted for a shorter amount of time than the threshold period of time (e.g., decision block 1010 is "No"), the robot 100 resumes its activities at block 1014. But if the robot 100 has been tilted for a greater time t than the threshold period of time T (e.g., decision block 1010 is "Yes"), the controller 150 executes, at block 1012, an escape behavior 300i to release the robot 100 from the tilted position. Accordingly, the controller 150 determines whether or not the robot is tilted under the following conditions.

$$\alpha < \alpha_T, \text{ and } t < T; \text{ no tilt} \quad (1)$$

$$\alpha < \alpha_T, \text{ and } t > T; \text{ robot tilted} \quad (2)$$

The robot 100 may tilt in a combination tilt about the X axis and the Y axis, i.e., the robot 100 may pitch and roll.

The threshold tilt angle $\alpha_T$ is the summation of vectors of each tilt about the X axis and the Y axis. Therefore, if the robot 100 is only pitched, then the threshold angle $\alpha_T$ equals the pitched angle. Similarly, if the robot 100 is only rolled, then the threshold angle $\alpha_T$ equals to the roll angle.

As shown in FIG. 9A, the robot 100 may migrate between a hard floor 10a (e.g., the or hardwood) and carpet 10b, and in some cases a transition between the carpet 10b and the hard floor 10a is not a smooth transition, but at an elevation if moving from the hard floor 10a to the carpet 10b, or a demotion if moving from carpet 10b to the hard floor 10a. Therefore, the robot 100 may experience a tilt most likely in the north position (i.e., pitched down) or the south position (i.e., pitched up), and the robot 100 may transition from the tilt position in a short amount of time. In this case, the control system 210 may not execute an anti-tilt behavior 300b, because the amount of time is less than a threshold period of time (i.e. tilt period threshold) that the control system 210 uses to determine the issuance of the anti-tilt behavior 300b.

Figure 10B:
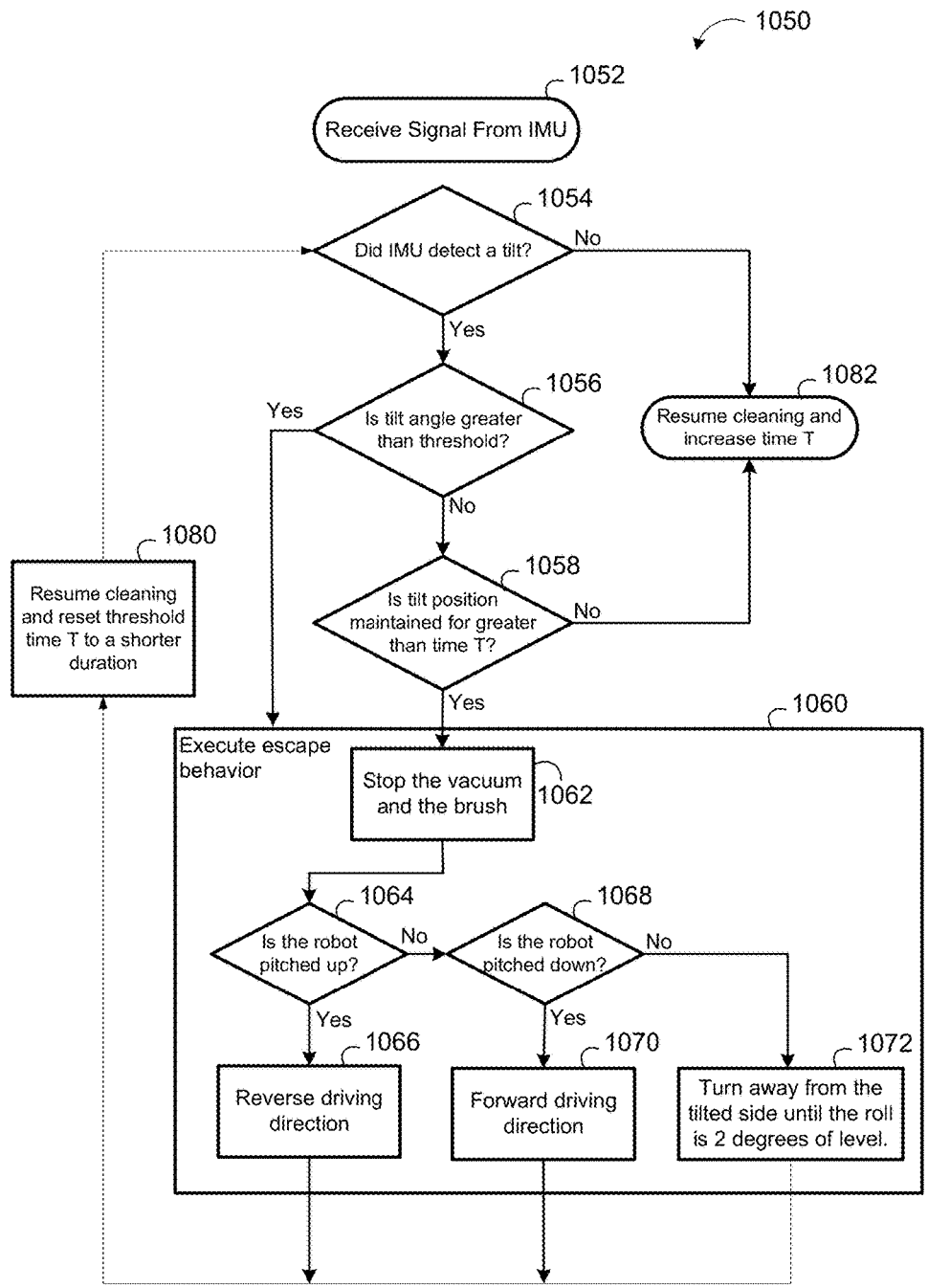
FIG. 10B is a flow diagram of the anti-tilt behavior of an exemplary autonomous mobile robot.

Referring to FIGS. 9A and 10B, in some implementations, the robot 100 is a cleaning robot 100. As shown in the flow diagram 1050 of FIG. 10B, the controller 150 receives a signal from the IMU 510d at block 1052, and at block 1054, determines if the received signal indicates that the robot 100 is tilted. If the robot 100 is not tilted (e.g., decision block 1054 is "No"), the robot 100 carries on with its cleaning activities at block 1082. However, if the robot 100 is tilted (e.g., decision block 1054 is "Yes"), the controller 150 determines, at decision block 1056, if the tilt angle $\alpha$ is greater than the threshold tilt angle $\alpha_T$. If the tilt angle $\alpha$ is greater than the threshold tilt angle $\alpha$ (e.g., decision block 1056 is "Yes"), the controller 150 executes, at block 1060, an escape behavior 300i to release the robot 100 from the tilted situation, and resume its activities on a flat surface afterwards at block 1080. However, if the tilt angle $\alpha$ is less than the threshold tilt angle $\alpha_T$ (e.g., decision block 1056 is "No"), the controller 150 determines, at decision block 1058, if the robot 100 has been tilted for a period of time greater than a threshold period of time. If the robot 100 has been tilted for a shorter period of time than the threshold period of time (e.g., decision block 1058 is "No"), the robot 100 resumes its cleaning activities at block 1082. But if the robot 100 has been tilted for a period of time greater than the threshold time (i.e. tilt period threshold) (e.g., decision block 1058 is "Yes"), the controller 150 executes, at block 1060, an escape behavior 300i to release the robot 100 from the tilted position. The escape behavior 300i may include stopping, at block 1062, the brushes 162 and vacuum 168 of the robot 100, then if the robot 100 is pitched up (i.e., tilted to the south) at decision block 1064, the robot 100 backs away from the obstacle 18 that caused it to tilt at block 1066. If the robot 100 is pitched down (i.e., tilted to the north) at decision block 1068, then the robot 100 drives forward at block 1070. In situations where the robot 100 is rolled to one side (i.e., left or right) (e.g., decision blocks 1064, 1068 are "No"), the robot 100 turns away from the obstacle 18 until the roll is within a threshold roll angle (e.g., 1 to 5 degrees) at block 1072 or, alternatively, the threshold tilt angle $\alpha_T$, then the robot 100 drives forward and resumes cleaning. If the robot 100 is tilted at an angle greater than the threshold tilt angle $\alpha$, but less than the threshold time period to execute the anti-tilt behavior 300b, the robot 100 might be transitioning from two different surfaces that have a bumpy separation in between and therefore not encountering a potential stasis condition.

In some examples, the robot 100 tilts while vacuuming when the robot 100 ingests a string or cord 18e (FIG. 11A) that is anchored, e.g., to a wall 20 (e.g., blind string, drape string, curtain string, shade string, etc.). When the robot 100 ingests the string 18e, it may become wound about the driven roller brush 162, causing the robot 100 to tilt. The IMU 510d detects the tilt in the robot 100 and therefore may trigger the anti-tilt behavior 300b. The controller 150 may execute an anti-tassel behavior 300k that sets a slight reverse bias on the motors 122a, 122b driving the roller brush 162 (e.g., roller brush), such that the driven roller brush 162 does not actively rotate in a reverse direction (which may cause the string 18e to become re-entangled), but rather aids the reverse rotation of the driven roller brush 162, as the robot 100 backs away from the ingested string 18e. The robot 100 may also stop the vacuum 168 and attempt to move away from the location that caused the tilting situation, allowing the robot 100 to unspool the string 18e and escape.

Figure 9B:
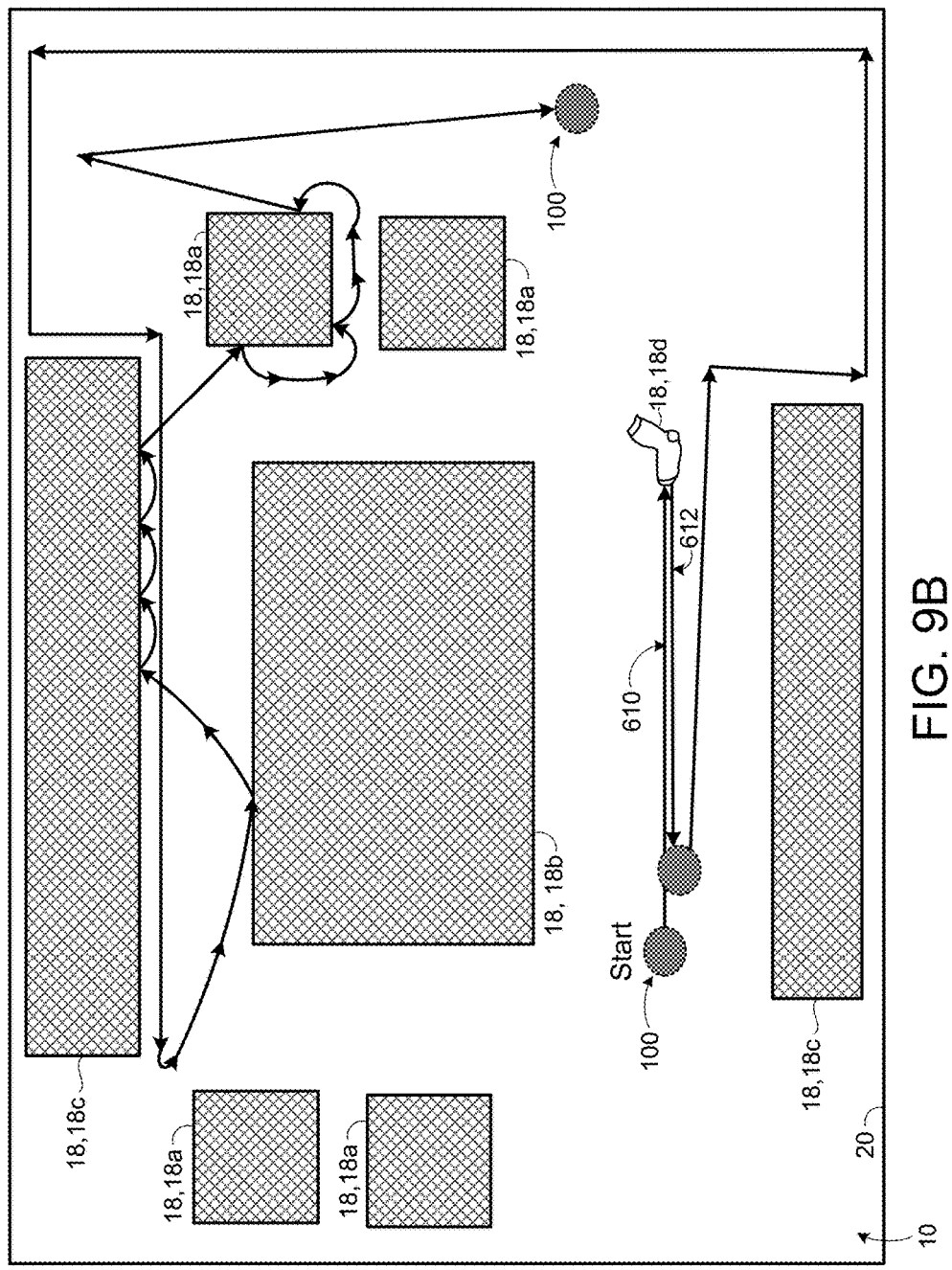
FIG. 9B is a top view of an exemplary autonomous robot as it traverses a space.

Referring to FIG. 9B, in some implementations, the control system 210 records the driving path 610 of the robot 100, e.g., by storing way points in non-transitory memory 154. The control system 210 may maintain a history of the driving path 610 for a period of time (e.g., 0.5 seconds, 1 second, 2 seconds, etc.). In some examples, when the anti-tilt behavior 300b is executed, the robot 100 follows its previously recorded path 612 into a safe area to avoid getting stuck once again. In some examples, the controller 150 executes a retro-traverse behavior 300m that causes issuance of commands to the robot resources 240 to follow the stored waypoint starting with the last recorded waypoint in time. The retro traverse behavior 300m autonomously navigates the autonomous mobile robot 100 back along a return path interconnecting various previously traversed coordinates. In some examples, after escaping a stasis state or an anti-tilt behavior 300b, the robot 100 does not attempt the last maneuver performed until it is at a predefined distance from the obstacle 18 that caused the tilt.

Figure 11B:
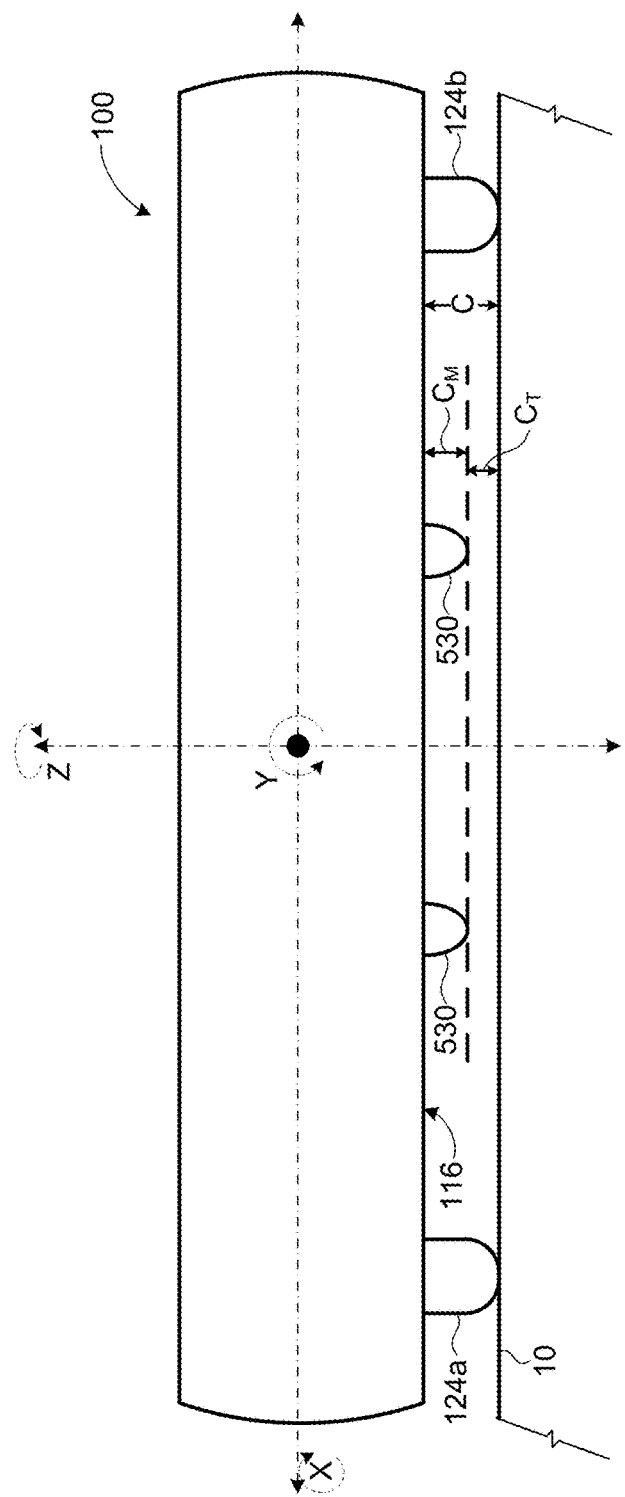
FIG. 11B is a front view of an exemplary autonomous cleaning mobile robot.
Figure 12:
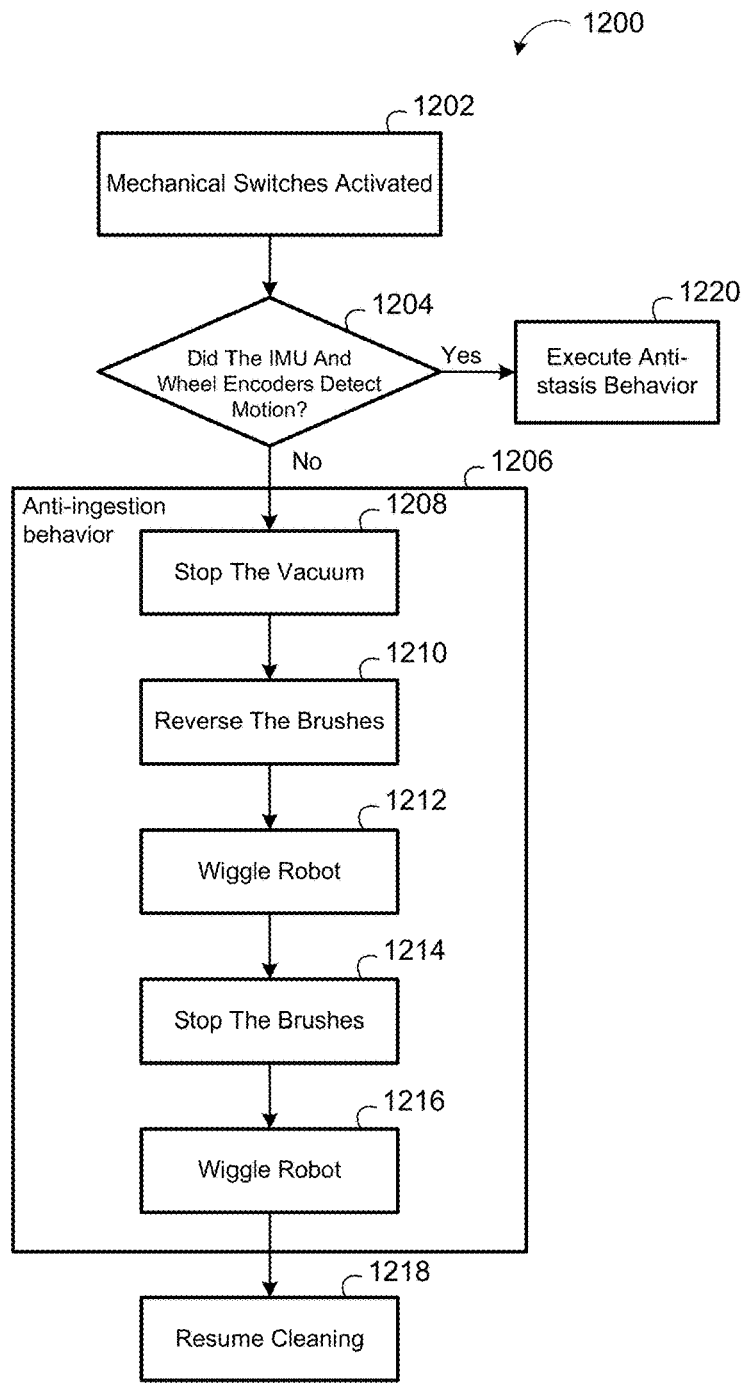
FIG. 12 is a flow diagram of the anti-ingestion behavior of an exemplary autonomous mobile robot.

Referring to FIGS. 11A-12, in some implementations the behavior system 210a includes an anti-ingestion behavior 300c, which prevents the robot 100 from picking up big objects 12 (e.g., socks, scarves). Referring back to FIG. 3, in some implementations, the robot 100 includes mechanical switches 530 disposed on the front bottom surface 116 portion of the robot 100 in front of the drive wheels 124a, 124b. The mechanical switches 530 detect objects 12, 18 that should not be picked up by the robot 100. The switches 530 may be disposed adjacent to one another, or separated by a distance (e.g., equidistantly). The mechanical switches 530 may be substantially opposed along the transverse axis X defined by the body 110. The robot 100 has a clearance distance C from the floor surface 10 to the bottom surface 116 of the robot 100. The mechanical switches 530 have a distance $C_M$ from the bottom surface 116 of the robot 100. $C_T$ is a clearance distance threshold where the robot 100 can traverse without activating the mechanical switches.

$$C = C_M + C_T \tag{3}$$

$$C_T = C - C_M \tag{4}$$

When the robot 100 traverses an obstacle 18 that has a height $C_O$ greater than a threshold height $C_T$, the object 12 may physically actuate the switch or switches 530. However, if the obstacle 18 has a height $C_O$ less than the threshold height $C_T$, the object 12 does not physically actuate the switch or switches 530.

For example, contact with the object 12 may cause closure of a circuit, activating the switches 530. When the switches 530 are simultaneously activated for a period of time greater than a threshold period of time, the behavior system 210a may execute the anti-ingestion behavior 300c. The threshold period of time may be adjustable and or tunable. The anti-ingestion behavior 300c may stop the vacuum 168 and/or reverse-bias the roller brushes 162 (e.g., to passively rotate in a reverse direction to allow a cord wound about the roller brush 162 to unwind as the robot 100 backs away). Additionally or alternatively, the robot 100 wiggles by moving about its Z axis in small angles for a certain period of time (e.g., 0.5 seconds, 0.6 seconds, etc.). Then the controller 150 issues a command to stop rotation of the roller brushes 162, and commands the robot 100 to wiggle for another period of time (e.g., 1.8 seconds). Afterwards, the robot 100 resumes a behavior 300.

Referring to the flow diagram 1200 of FIG. 12, in some examples, the mechanical switches 530 are activated at block 1202 by larger pieces of debris 14 that need to be picked up by the robot 100. In such instances, the controller 150 determines if the debris detector 510a is activated. If so, the controller 150 activates the roller brush 162 to pick up the debris 14. However, if the debris detector 510a was not activated, the controller 150 determines, at decision block 1204, if the IMU 510d and/or the wheel encoders 121a, 121b detect a change in inertial movement. If the IMU 510d and/or the wheel encoders 121a, 121b detected movement (e.g., decision block 1204 is "Yes"), the robot 100 determines if it is in a stasis state, and if so, executes the anti-stasis behavior 310a at block 1220, as previously described with reference to FIGS. 8A and 8B. If the IMU 510d and/or the wheel encoders 121a, 121b did not detect any change in inertial movement (e.g., decision block 1204 is "No), the behavior system 210a executes, at block 1206, the anti-ingestion behavior 300c. The anti-ingestion behavior 300c may include stopping the robot (block 1208), reversing the brushes (block 1210), wiggling the robot (block 1212), stopping the brushes (block 1214), and/or wiggling the robot block 1216) after stopping the brushes before resuming cleaning at block 1218. Therefore, an indication by the IMU 510d that the robot 100 is tilted may override the anti-ingestion behavior. In some examples, the controller 210 initiates the anti-ingestion behavior 300c when the mechanical switches 530 are activated for a threshold period of time.

Figure 13:
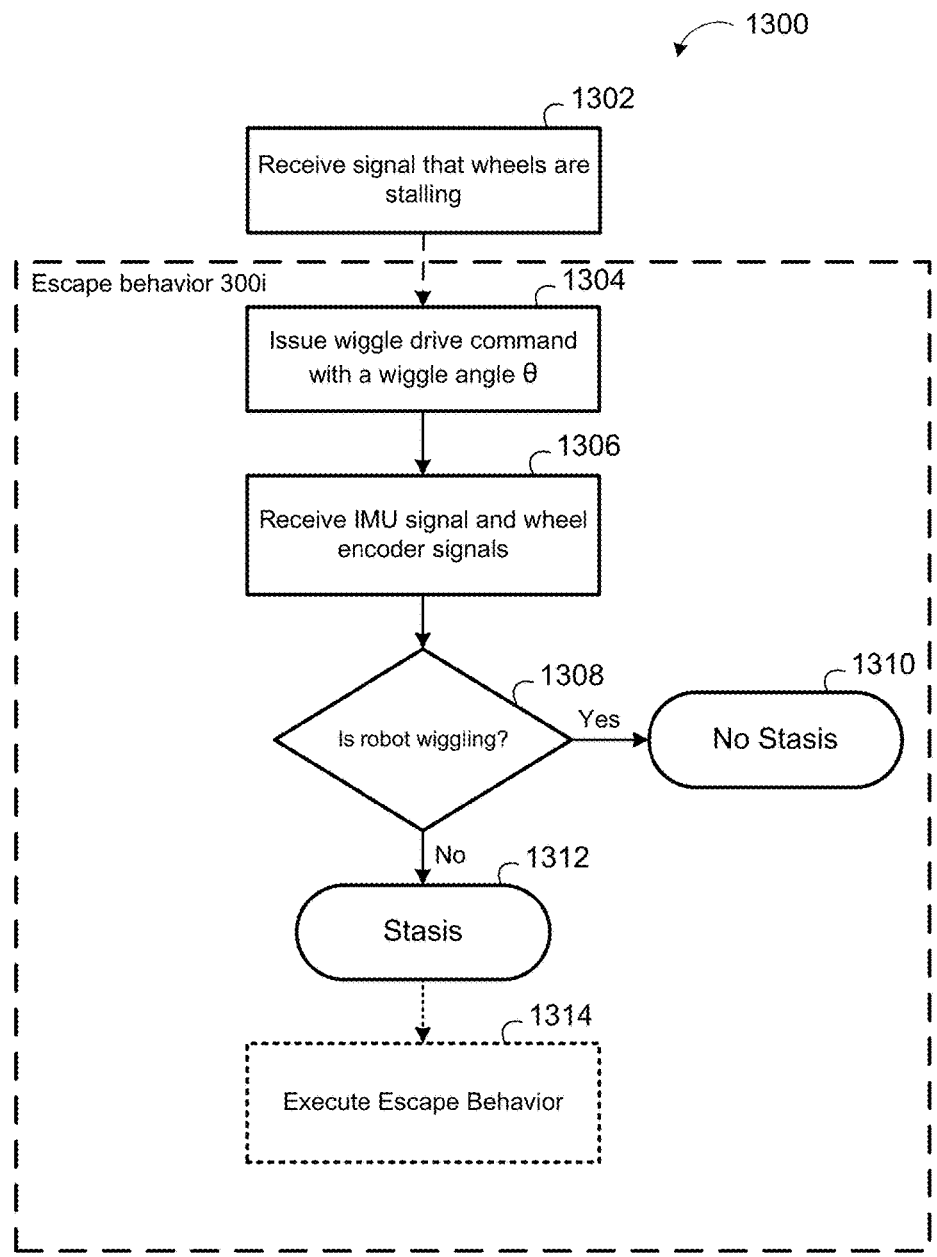
FIG. 13 is a flow diagram of the wheel jam behavior of an exemplary autonomous mobile robot.

Referring to a flow diagram 1300 of FIG. 13, in some implementations, the behavior system 210a includes a wheel jam behavior 300d. The behavior system 210a executes the wheel jam behavior 300d when the wheels 124a, 124b of the wheel module 120a, 120b stall due to an object 12 getting stuck in the wheels 124a, 124b. The controller 150 receives, at block 1302, a signal from the sensor system 500 that the wheels 124a, 124b are stalling at a rate greater than a threshold value. The behavior system 210a may execute an escape behavior 300i to resume the activity of the robot 100. For instance, the controller 150 may issue will drive commands with a wiggle angle at block 1304, and at block 1304, receive signals from the IMU 510d and the wheel encoders 121a, 121b to determine whether or not the robot 100 is wiggling at decision block 1308. If the controller 150 determines the robot 100 is wiggling (e.g., decision block 1308 is "Yes"), the controller 150 may determine no stasis on the robot 100 at block 1310. If, however, the controller 150 determines the robot 100 is not wiggling (e.g., decision block 1308 is "No"), the controller 150 may determine, at block 1312, stasis on the robot 100, and at block 1314, execute the escape behavior 300i. In some examples, the behavior system 210a executes a wiggle behavior 300l that causes issuances of alternating reverse drive commands to the right and left wheels 124a, 124b until the object 18d (e.g., socks) is removed and the wheels 124a, 124b are no longer stalling.

Figure 14:
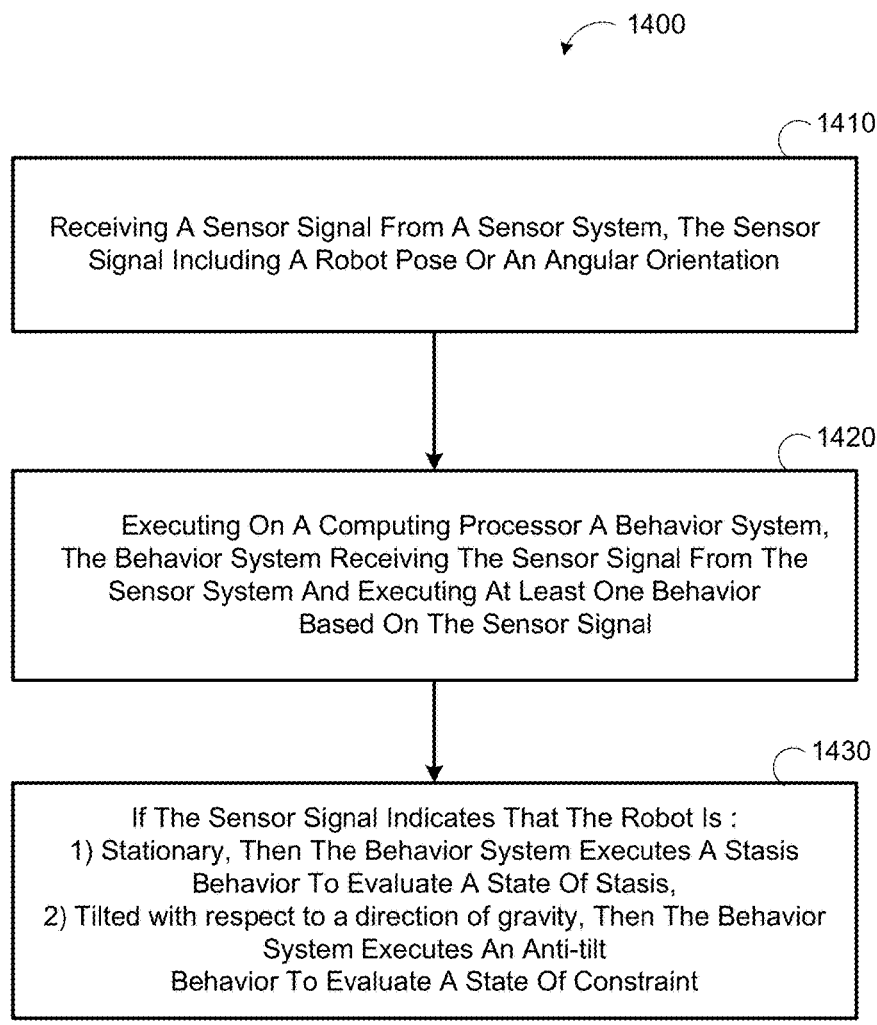
FIG. 14 is a schematic view of an exemplary arrangement of operations for operating the autonomous mobile robot.

FIG. 14 provides an exemplary arrangement of operations for a method 1400 of operating an autonomous mobile robot 100. The method 1400 including receiving 1410 a sensor signal from a sensor system 500. The sensor signal includes an inertial measurement or an angular orientation. The method 1400 further includes executing 1420 on a computing processor 152 a behavior system 210a. The behavior system 210a receives the sensor signal from the sensor system 500 and executes at least one behavior 300 based on the sensor signal. If the sensor signal indicates 1430 that the robot 100 is stationary, the behavior system 210a executes an anti-stasis behavior 300a to evaluate a state of stasis (e.g. wedged, beached or slewed), and if the sensor signal indicates that the robot 100 is tilted with respect to a supporting surface 10 (e.g., the floor), the behavior system 210a executes an anti-tilt behavior 300b to evaluate a state of constraint.

In some implementations, the anti-stasis behavior 300a includes issuing a wiggle command having a wiggle angle $\theta$. The wiggle command includes drive commands to drive in alternating left and right drive directions angled with respect to each other by the wiggle angle $\theta$. The method 1400 may further include receiving, at a computing processor 152, a second sensor signal from the sensor system 500. If the second sensor signal indicates that the robot 100 is stationary after executing a first wiggle command having a first wiggle angle $\theta$, the anti-stasis behavior 300a issues a second wiggle command having a second wiggle angle greater than the first wiggle angle $\theta$.

In some examples, the method 1400 includes executing the anti-tilt behavior 300b when the robot 100 is tilted with respect to the direction of gravity for at least a threshold period of time T. The method 1400 may include executing a forward drive command when the robot 100 is pitched up with respect to the direction of gravity and the forward drive direction F, and executing a reverse drive command when the robot is pitched down with respect to the direction of gravity and the forward drive direction F.

In some examples, the method 1400 includes executing the anti-tilt behavior 300b when the robot 100 is tilted with respect to the direction of gravity at an angle greater than a threshold angle $\alpha_T$. The method 1400 may include executing a forward drive command when the robot 100 is pitched up with respect to the direction of gravity and the forward drive direction F, and executing a reverse command when the robot 100 is pitched down with respect to the direction of gravity and the forward drive direction F.

In some implementations, the method 1400 further includes activating a mechanical switch 530 disposed on a bottom surface 116 of the robot 100 forward of a drive wheel 124a, 124b of a drive system 120a, 120b. The mechanical switch 530 activates when an obstacle 18 contacts the mechanical switch 530. Additionally, the method 1400 may include executing the anti-stasis behavior 300a when the mechanical switches 530 are activated and the sensor system 500 detects a stationary robot 100. Referring back to FIG. 11B, the mechanical switches 530 have a distance $C_M$ from the bottom surface 116 of the robot 100. $C_T$ is a clearance distance threshold where the robot 100 can traverse without activating the mechanical switches 530 (See Eq. 3 and 4). When the robot 100 traverses an obstacle 18 that has a height $C_O$ greater than a threshold height $C_T$, the object 12 may physically actuate the switch or switches 530. However, if the obstacle 18 has a height $C_O$ less than the threshold height $C_T$, the object 12 does not physically actuate the switch or switches 530.

In some implementations, the method 1400 includes cleaning or treating the floor surface 10 using a cleaning system 160. The method 1400 may include executing an anti-ingestion behavior 300c when the mechanical switches 530 are activated and the sensor system 500 detects motion. The anti-ingestion behavior 300c causes issuance of a cleaning stop command for stopping a cleaning behavior (e.g., spot cleaning behavior 300e, dirt hunting behavior 300h) and issues a wiggle command having a wiggle angle θ. The wiggle command includes drive commands to drive in alternating left and right drive directions angled with respect to each other by the wiggle angle θ. The wiggle command allows the robot 100 to release an object 18d (e.g., socks) that is causing the wheels 124a, 124b to stall. In some examples, the method 1400 includes executing a wheel jam behavior 300d when the controller 150 receives a signal from the sensor system 500 indicating that a wheel 124a, 124b of the robot 100 is stalling at a stalling rate less than a stalling threshold, the wheel jam behavior 300d causes issuance of the wiggle command for releasing a stalled wheel 124a, 124b of the robot 100.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An autonomous mobile robot comprising:
   a drive system configured to maneuver the robot over a floor surface;
   a sensor system comprising wheel encoders and an inertial measurement unit configured to measure a pose of the robot, the sensor system configured to issue signals indicative of the pose of the robot; and
   a controller in communication with the drive system and the sensor system,
   wherein the controller is configured to control the drive system to execute an anti-stasis behavior in response to at least one signal from the sensor system indicating that the robot is constrained, and
   wherein the controller is configured to control the drive system to execute an anti-tilt behavior in response to at least one signal from the inertial measurement unit of the sensor system indicating that the robot is tilted with respect to a direction of gravity.

2. The robot of claim 1, wherein the drive system is configured to evaluate a state of constraint by executing a first wiggle command having a first wiggle angle, the first wiggle command comprising drive commands to drive in alternating left and right drive directions angled with respect to each other by the first wiggle angle.

3. The robot of claim 2, wherein when the controller receives at least one signal from the inertial measurement unit or at least one of the wheel encoders indicating that the robot is not exhibiting wiggle drive motions as commanded, the robot is configured to execute a second wiggle command having a second wiggle angle greater than the first wiggle angle.

4. The robot of claim 3, wherein the controller is configured to issue an anti-stasis command to the drive system when signals of the inertial measurement unit and/or at least one of the wheel encoders are not within an allowable tolerance for indicating robot movement.

5. The robot of claim 1, wherein a state of constraint comprises the robot entering or being in a wedged position with respect to an object.

6. The robot of claim 5, wherein the at least one signal from the sensor system comprises:
   a bump signal indicating contact of the robot with the object; and
   a wheel drop signal indicating movement of a wheel of the drive system away from the robot body.

7. The robot of claim 1, wherein the anti-stasis behavior comprises execution of a drive command that backs the robot away from an impediment or turns the robot away from a side of the robot experiencing constraint.

8. The robot of claim 7, wherein the anti-stasis behavior further comprises execution of a drive command that drives the robot in an arcuate trajectory.

9. The robot of claim 1, wherein the controller is configured to control the drive system to execute the anti-tilt behavior when the robot is tilted with respect to the direction of gravity for at least a threshold period of time.

10. The robot of claim 9, wherein the anti-tilt behavior comprises execution of a reverse drive command when the robot is pitched up with respect to the direction of gravity and a forward drive direction, and comprises execution of a forward drive command when the robot is pitched down with respect to the direction of gravity and the forward drive direction.

11. The robot of claim 1, wherein the controller is configured to control the drive system to execute the anti-tilt behavior when the robot is tilted with respect to the direction of gravity at an angle greater than a threshold angle.

12. The robot of claim 11, wherein the anti-tilt behavior comprises execution of a reverse drive command when the robot is pitched up with respect to the direction of gravity and a forward drive direction, and comprises execution of a forward command when the robot is pitched down with respect to the direction of gravity and the forward drive direction.

13. The robot of claim 1, wherein the sensor system further comprises a plurality of mechanical switches disposed on a bottom surface of the robot forward of a driven wheel of the drive system, each of the mechanical switches configured to be activated when an obstacle contacts the mechanical switch.

14. The robot of claim 13, wherein the controller is configured to control the drive system to execute the anti-stasis behavior when the mechanical switches are activated.

15. The robot of claim 14, further comprising a cleaning system for cleaning or treating the floor surface, wherein the cleaning system comprises a driven roller brush and a side brush.

16. The robot of claim 15, wherein the controller is configured to control the drive system to execute an anti-ingestion behavior when the mechanical switches are activated and the sensor system detects motion, the anti-ingestion behavior comprising issuance of a cleaning stop command for stopping a cleaning behavior and issuance of a wiggle command having a wiggle angle, the wiggle command comprising drive commands to drive in alternating left and right drive directions angled with respect to each other by the wiggle angle.

17. The robot of claim 16, wherein the controller is configured to control the drive system to execute a wheel jam behavior when the controller receives a signal from the sensor system indicating that the wheels of the robot are stalling at a stalling rate less than a stalling threshold rate, the wheel jam behavior causing issuance of the wiggle command for releasing a stalled wheel of the robot.

18. The robot of claim 17, further comprising a driven roller brush extending parallel to a transverse axis X and configured to contact a floor surface, the driven roller brush being configured to rotate in a first direction about the X axis, wherein the anti-ingestion behavior comprises biasing of the roller brush to passively rotate in a second direction opposite the first direction.

19. An autonomous mobile robot, comprising:
   a drive system that drives right and left drive wheels and is configured to maneuver the robot over a floor surface;
   a sensor system comprising an inertial measurement unit configured to measure a pose of the robot; and
   a controller in communication with the drive system and the sensor system,
   wherein the controller controls the drive system to execute an anti-tilt behavior in response to at least one signal from the inertial measurement unit of the sensor system indicating that the robot is tilted with respect to a direction of gravity.

20. The robot of claim 19, wherein the anti-tilt behavior comprises execution of a reverse drive command when the robot is pitched up with respect to the direction of gravity and a forward drive direction, and comprises execution of a forward drive command when the robot is pitched down with respect to the direction of gravity and the forward drive direction.

21. The robot of claim 19, wherein the controller is configured to control the drive system to execute the anti-tilt behavior when the robot is tilted with respect to the direction of gravity at an angle greater than a threshold angle.

22. The robot of claim 19, wherein the sensor system further comprises a plurality of mechanical switches disposed on a bottom surface of the robot forward of driven wheels of the drive system, each of the mechanical switches configured to be activated when an obstacle contacts the mechanical switch.

23. The robot of claim 22, wherein the controller is configured to control the drive system to execute an anti-ingestion behavior when the mechanical switches are activated and the sensor system detects motion, the anti-ingestion behavior comprising issuance of a cleaning stop command for stopping a cleaning behavior and issuance of a wiggle command, the wiggle command comprising drive commands to drive in alternating left and right drive directions.

24. The robot of claim 23, further comprising a driven roller brush extending parallel to a transverse axis X and configured to contact a floor surface, the driven roller brush being configured to rotate in a first direction about the X axis, wherein the anti-ingestion behavior comprises biasing of the roller brush to passively rotate in a second direction opposite the first direction.

* * * * *

UNITED STATES PATENT AND TRADEMARK OFFICE
CERTIFICATE OF CORRECTION

PATENT NO. : 10,124,490 B2
APPLICATION NO. : 15/252355
DATED : November 13, 2018
INVENTOR(S) : Mark Steven Schnittman et al.

It is certified that error appears in the above-identified patent and that said Letters Patent is hereby corrected as shown below:

In the Claims

Column 22, Line 5-6, in Claim 17, delete "wheel jam" and insert -- wheel-jam --, therefor.

Column 22, Line 9, in Claim 17, delete "wheel jam" and insert -- wheel-jam --, therefor.

Signed and Sealed this
First Day of January, 2019

Andrei Iancu
*Director of the United States Patent and Trademark Office*